(12) United States Patent
Won

(10) Patent No.: US 11,404,877 B2
(45) Date of Patent: Aug. 2, 2022

(54) HIERARCHICAL POWER CONTROL SYSTEM

(71) Applicant: LS ELECTRIC CO., LTD., Anyang-si (KR)

(72) Inventor: Sung-Ha Won, Anyang-si (KR)

(73) Assignee: LS ELECTRIC CO., LTD., Anyang-si (KR)

(*) Notice: Subject to any disclaimer, the term of this patent is extended or adjusted under 35 U.S.C. 154(b) by 142 days.

(21) Appl. No.: 16/765,750

(22) PCT Filed: Nov. 15, 2018

(86) PCT No.: PCT/KR2018/013987
§ 371 (c)(1),
(2) Date: May 20, 2020

(87) PCT Pub. No.: WO2019/107806
PCT Pub. Date: Jun. 6, 2019

(65) Prior Publication Data
US 2020/0295567 A1 Sep. 17, 2020

(30) Foreign Application Priority Data

Nov. 28, 2017 (KR) .................. 10-2017-0159938
Nov. 28, 2017 (KR) .................. 10-2017-0159939

(51) Int. Cl.
*G05D 3/12* (2006.01)
*G05D 5/00* (2006.01)
(Continued)

(52) U.S. Cl.
CPC . *H02J 3/32* (2013.01); *H02J 3/44* (2013.01)

(58) Field of Classification Search
CPC ........ H02J 3/32; H02J 3/44; H02J 3/04; H02J 9/06; H02J 13/00004; H02J 2310/12;
(Continued)

(56) References Cited

U.S. PATENT DOCUMENTS 10,700,521 B2 * 6/2020 Shim ................ H02J 7/0068
11,025,091 B2 * 6/2021 Shim ................ H02J 13/0079
(Continued)

FOREIGN PATENT DOCUMENTS

JP 2008125290 A 5/2008
JP 2016001967 A 1/2016
(Continued)

OTHER PUBLICATIONS

International Search Report for related International Application No. PCT/KR2018/013987; report dated Jun. 6, 2019; (5 pages).
(Continued)

*Primary Examiner* — Richard Tan
(74) *Attorney, Agent, or Firm* — K&L Gates LLP

(57) ABSTRACT

This disclosure relates to a hierarchical power control system linked to a cloud server comprising a first microgrid cell including a first ESS equipped with a UPS structure and a first load with a power state managed by the first ESS; a second microgrid cell including a second load and a second ESS that manages a power state of the second load; a third microgrid cell including a third load; an emergency cell including an additional ESS equipped with a UPS structure and an additional emergency generator, and selectively connected to the second microgrid cell; a middleware server which communicates with the first to third microgrid cells and the emergency cell; and an integrated control system for receiving power supply state information of the first to third
(Continued)

microgrid cells, and establishing an integrated operation schedule based on the received power supply state information of the first to third microgrid cells.

32 Claims, 9 Drawing Sheets

(51) Int. Cl.
*G05D 9/00* (2006.01)
*G05D 11/00* (2006.01)
*G05D 17/00* (2006.01)
*H02J 3/32* (2006.01)
*H02J 3/44* (2006.01)

(58) Field of Classification Search
CPC .......... H02J 3/381; Y02B 70/30; Y02B 90/20; Y02A 30/60; Y04S 20/12; Y04S 20/248; G06Q 50/06
USPC ........................................................ 700/295
See application file for complete search history.

(56) References Cited

U.S. PATENT DOCUMENTS

| | | | |
|---|---|---|---|
| 2012/0180230 A1 | 7/2012 | Schmenger et al. | |
| 2013/0079943 A1* | 3/2013 | Darden, II | H02J 3/008 700/297 |
| 2015/0214737 A1* | 7/2015 | Ichino | H02J 13/00006 700/297 |
| 2015/0270744 A1 | 9/2015 | Lacarnoy | |

FOREIGN PATENT DOCUMENTS

| | | |
|---|---|---|
| JP | 2016189691 A | 11/2016 |
| KR | 20150136171 A | 12/2015 |

OTHER PUBLICATIONS

Written Opinion for related International Application No. PCT/KR2018/013987; report dated Jun. 6, 2019; (8 pages).
Choi, et al.; "Suggestions for BEMS Business Development"; The magazine of the Society of Air-conditioning and refrigerating Engineers of Korea; vol. 42, No. 4.; Apr. 2013; pp. 62-66; (10 pages).

* cited by examiner

[FIG. 1]
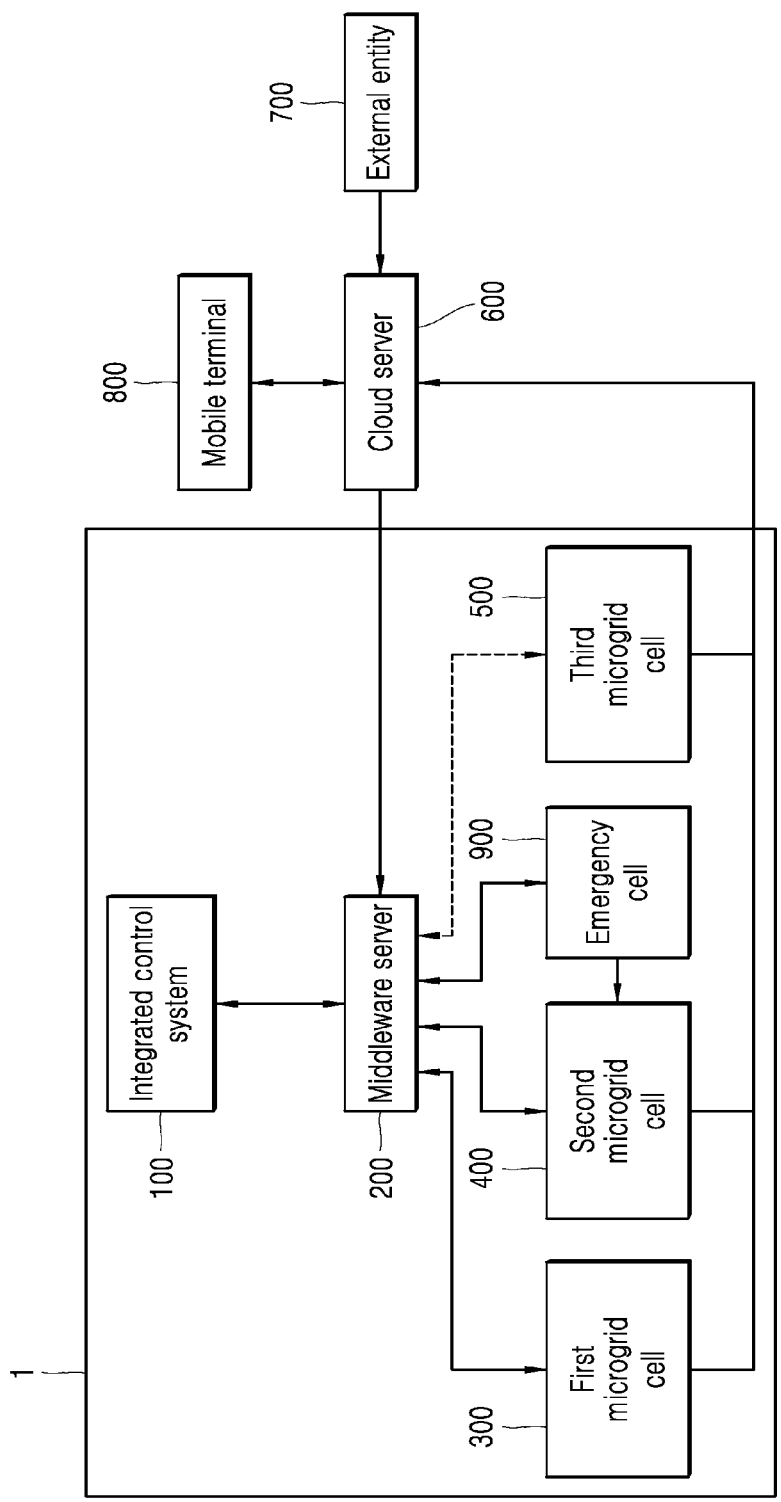

【FIG. 2】
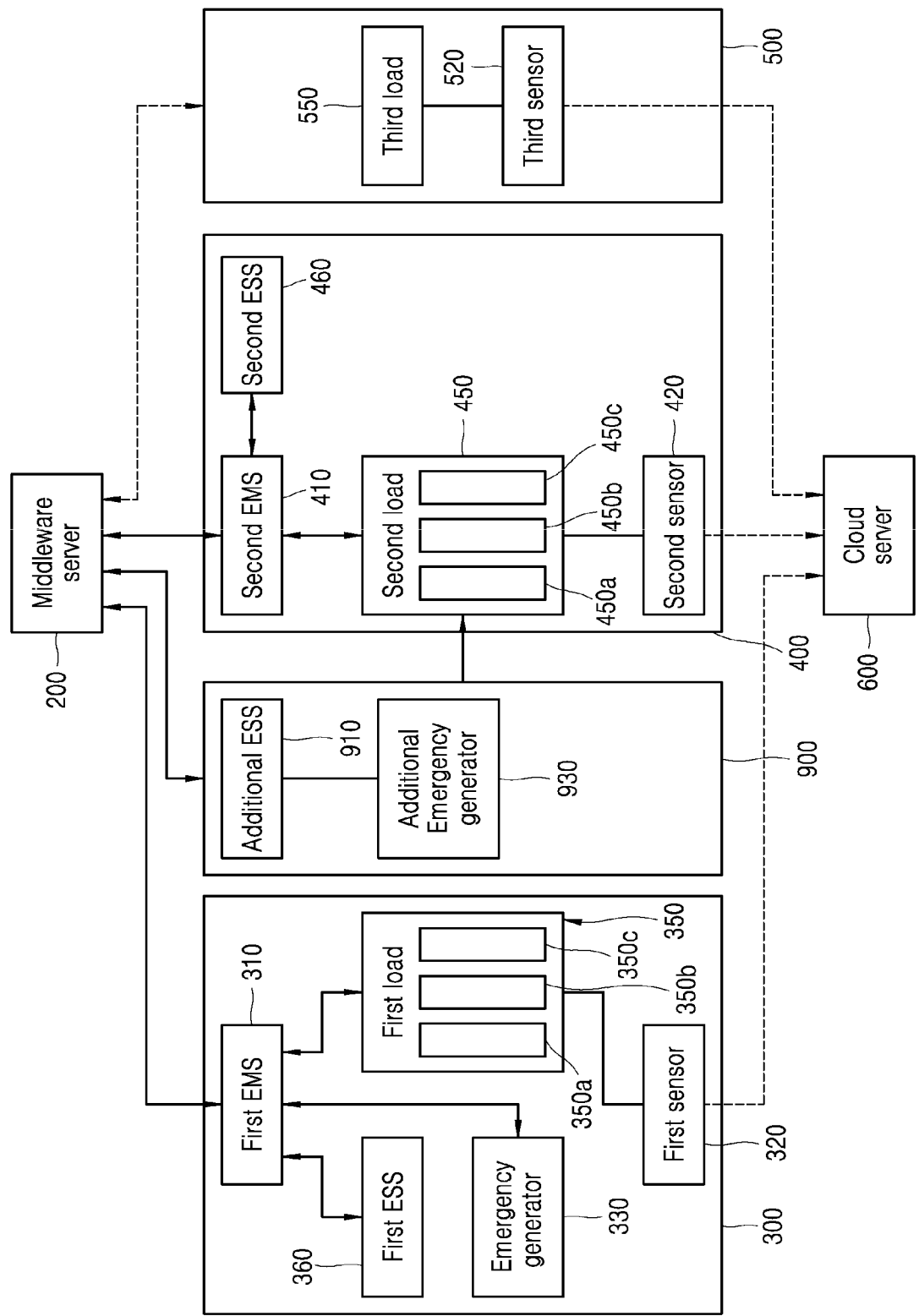

[FIG. 3]
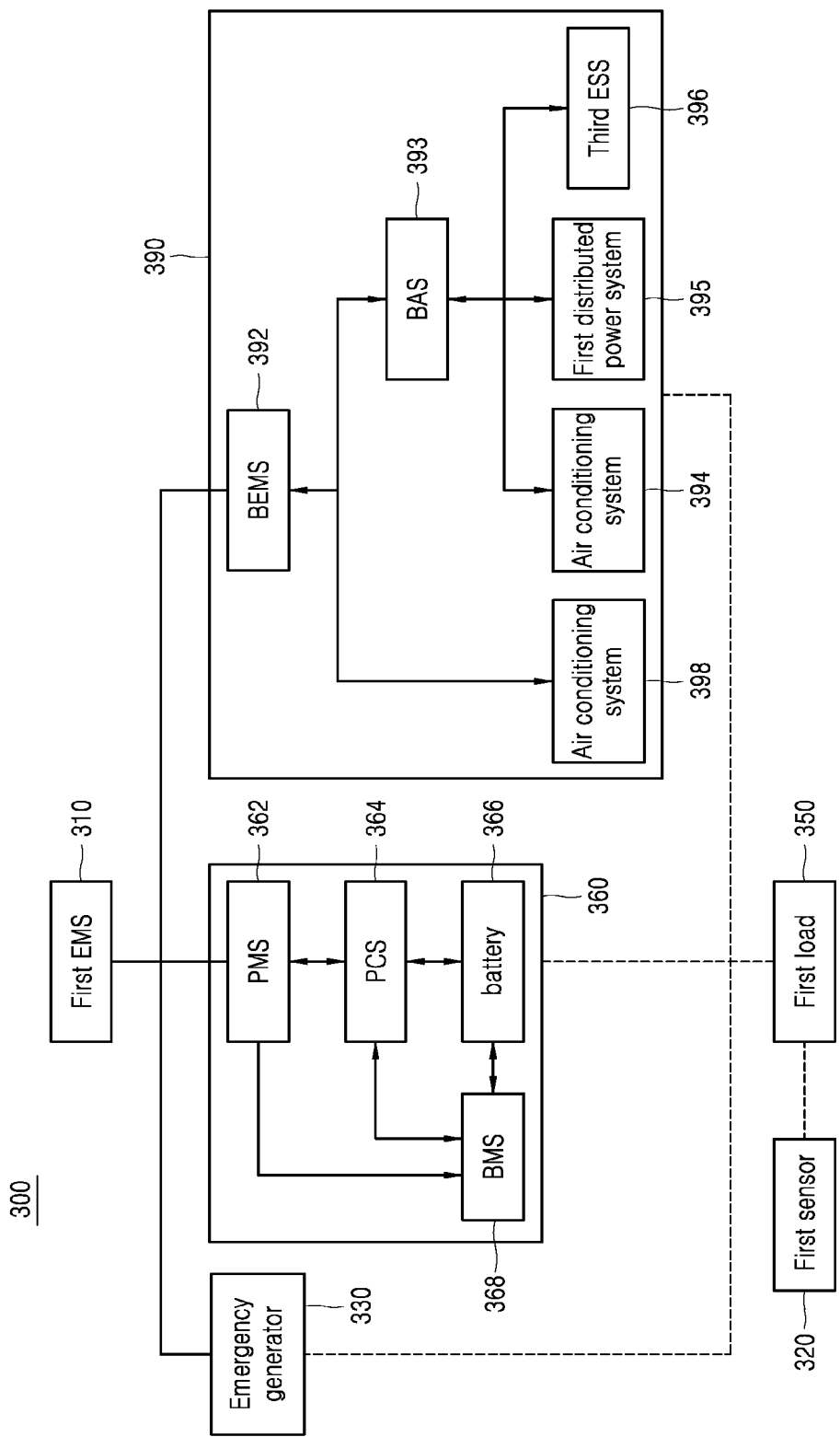

[FIG. 4]
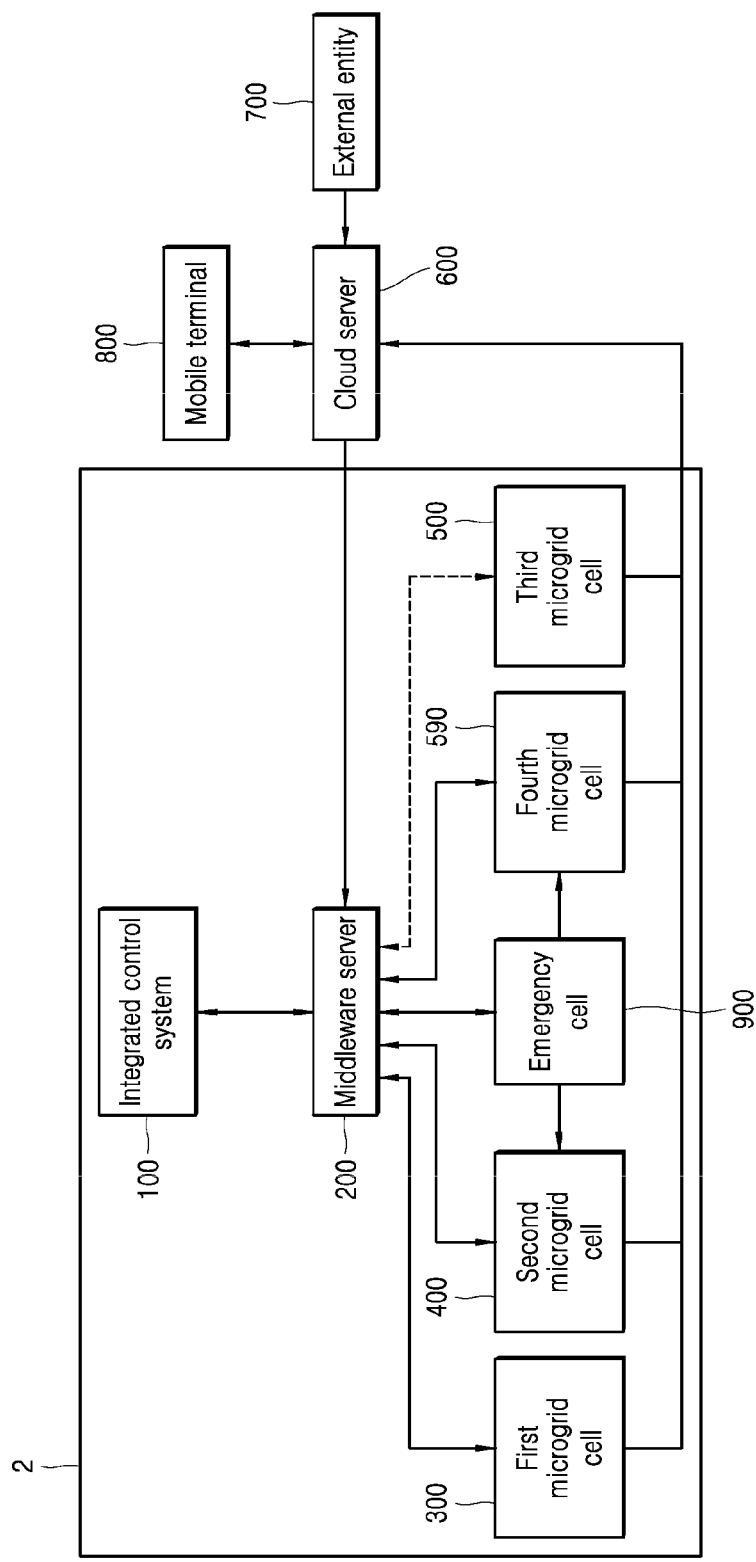

[FIG. 5]
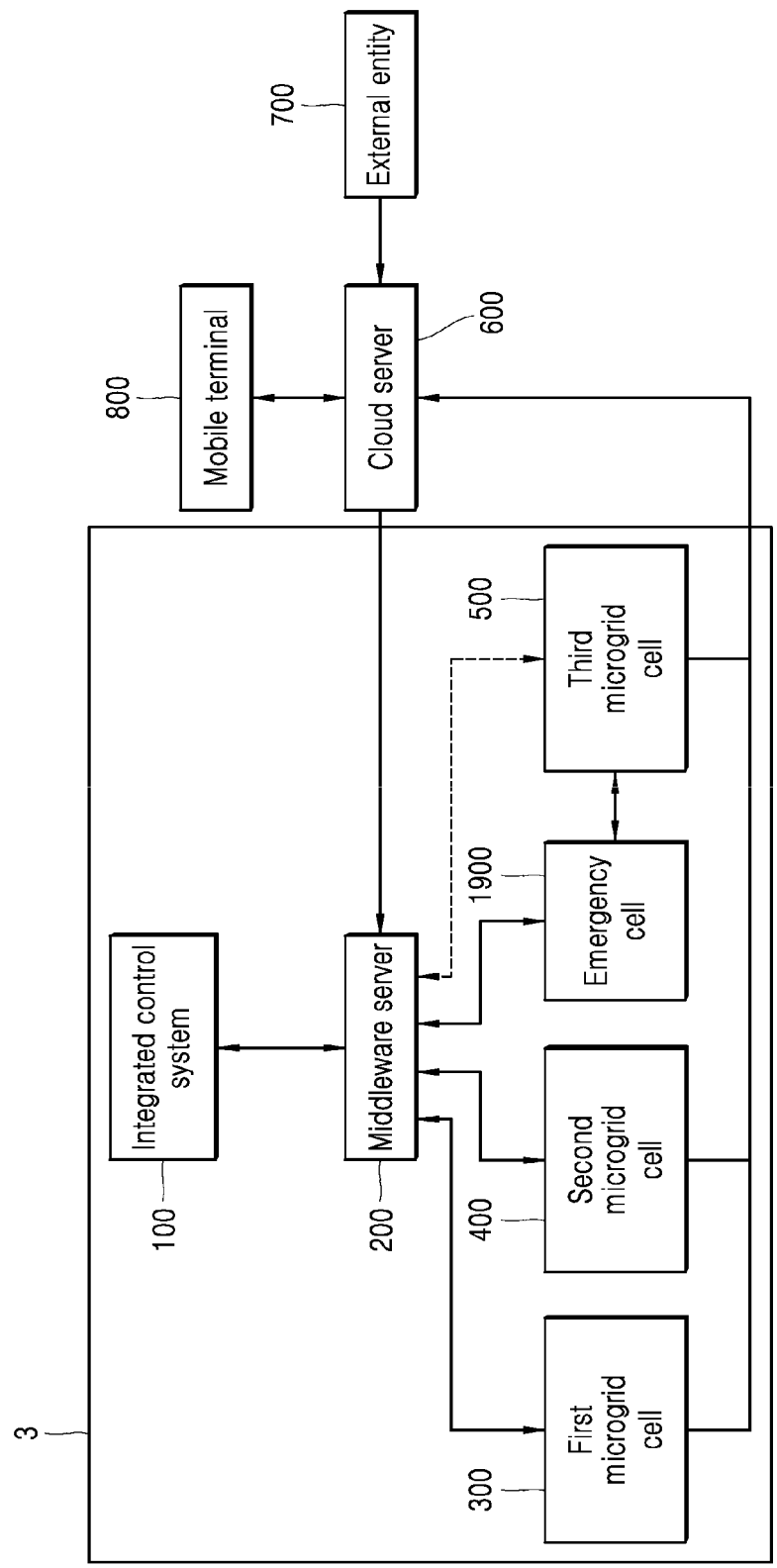

[FIG. 6]
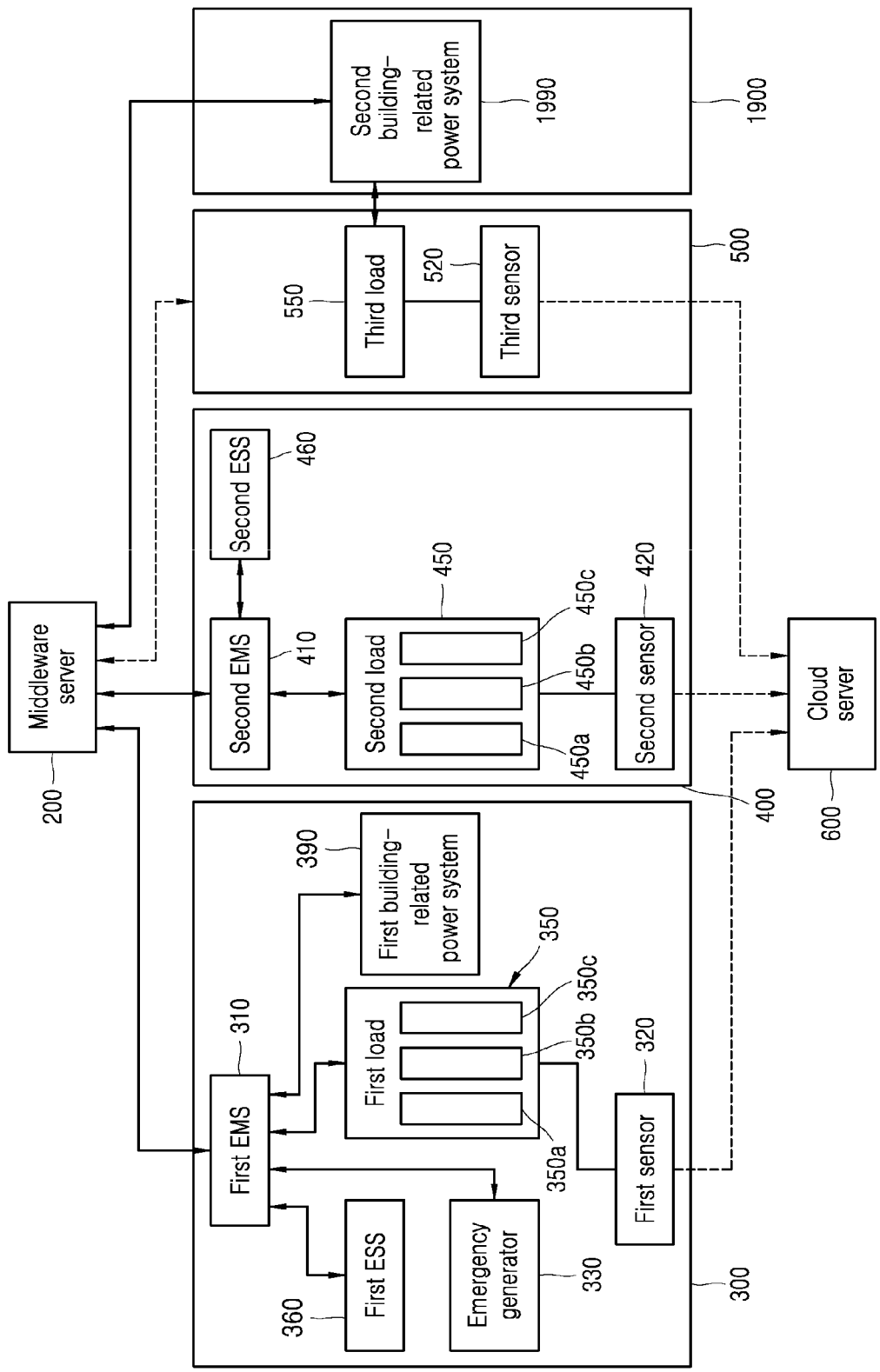

[FIG. 7]
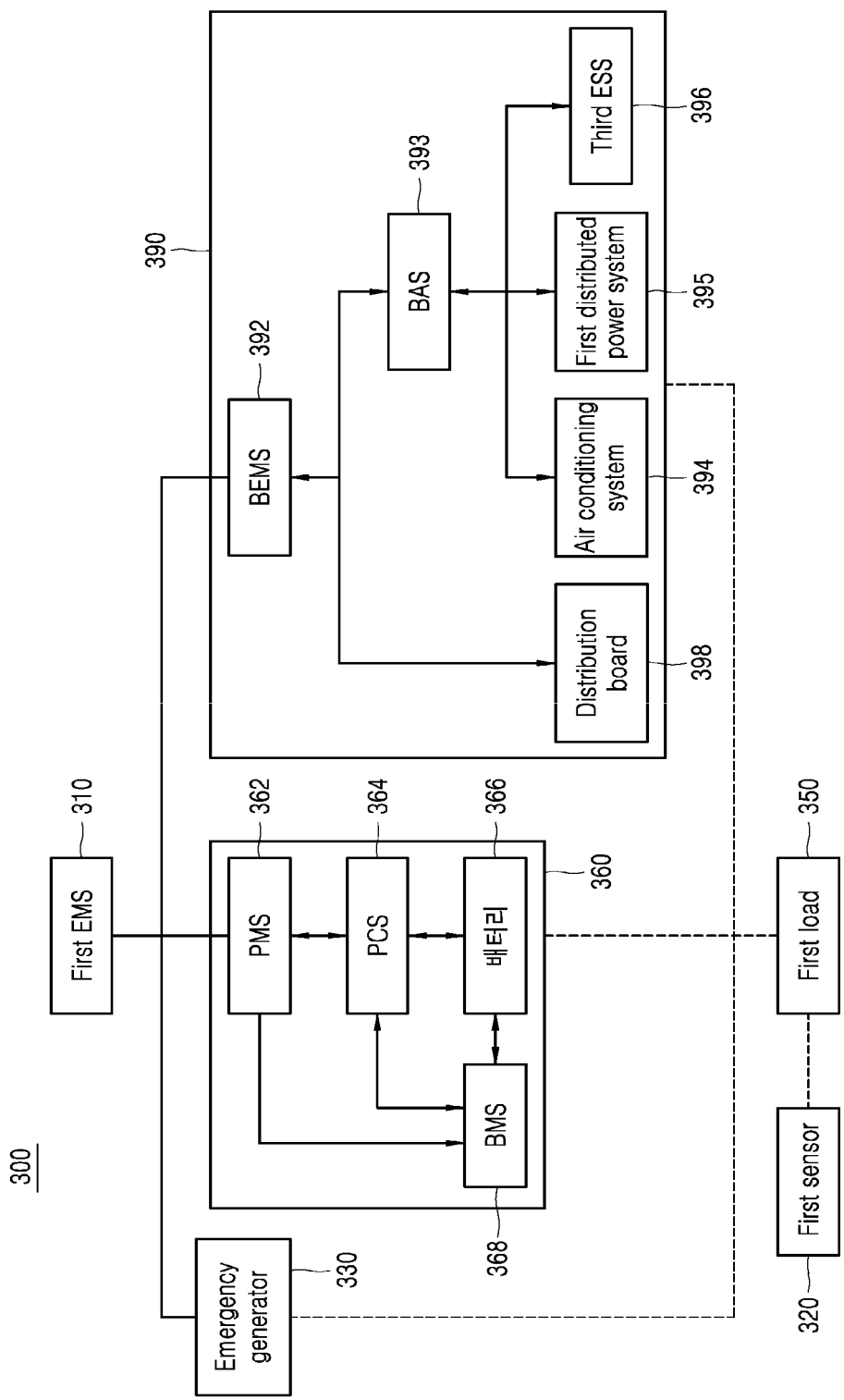

[FIG. 8]
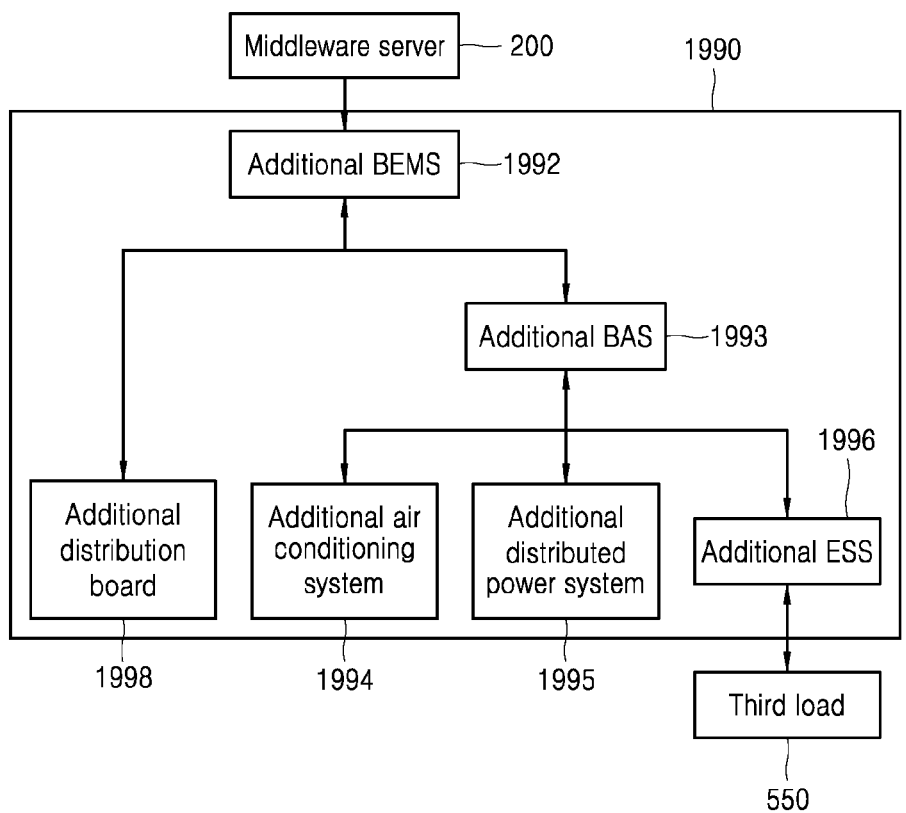

【FIG. 9】
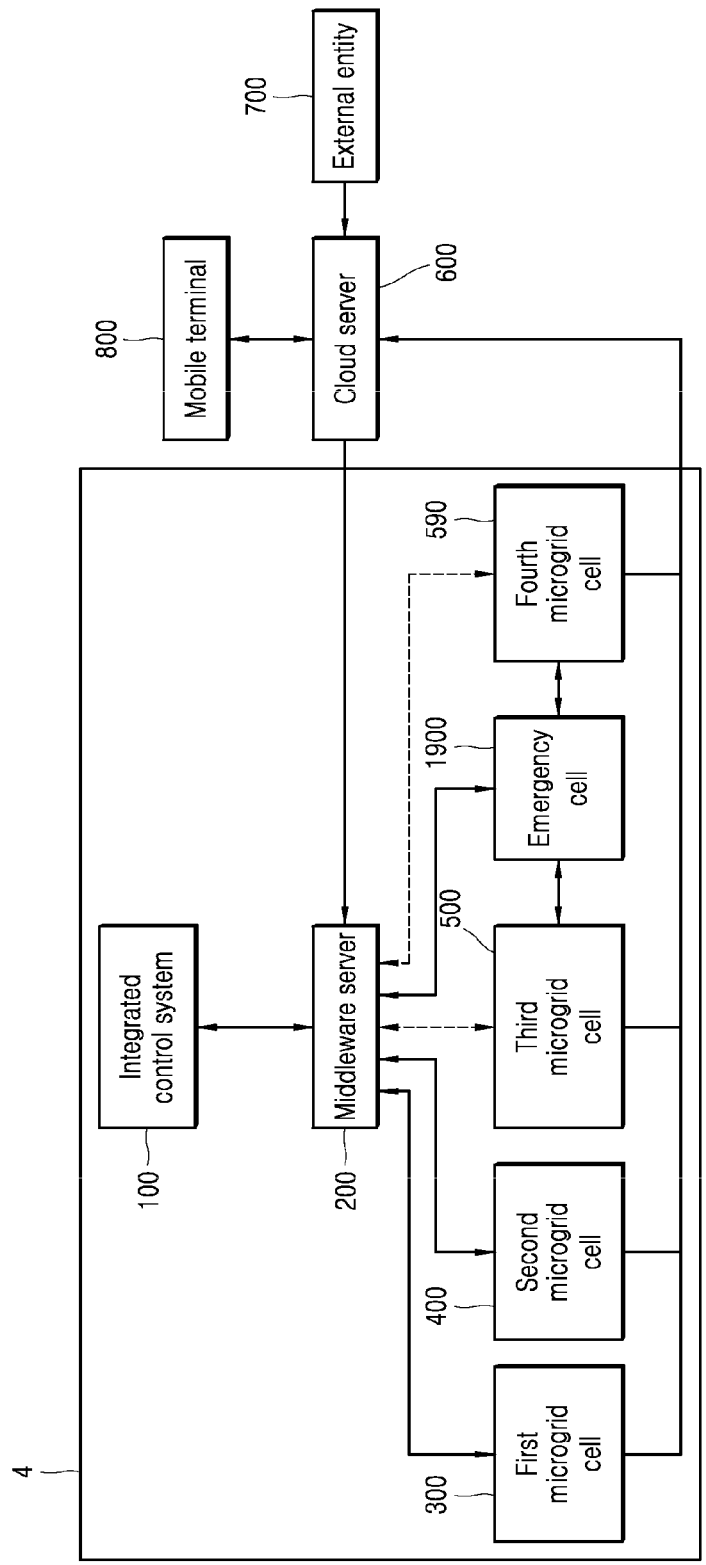

HIERARCHICAL POWER CONTROL SYSTEM

CROSS-REFERENCE TO RELATED APPLICATIONS

The present application is a National Stage of International Application No. PCT/KR2018/013987, filed on Nov. 15, 2018, which claims the benefit of earlier filing date and right of priority to Korean Application No. 10-2017-0159938 filed on Nov. 28, 2017, and Korean Application No. 10-2017-0159939 filed on Nov. 28, 2017, the contents of which are all hereby incorporated by reference herein in their entirety.

FIELD OF THE INVENTION

The present disclosure relates to a hierarchical power control system.

BACKGROUND OF THE INVENTION

An energy storage system (ESS) stores generated power in each of connected systems including a power plant, a substation, and a transmission line, etc. and selectively and efficiently uses the stored power when the power is needed, thereby to increase energy efficiency.

The energy storage system may level an electric load having a large fluctuation between time regions and between seasons, thereby improve an overall load rate. Thus, a power generation cost may be lowered, and an investment cost required for expansion of a power facility and an operation coat thereof may be reduced, thereby lowering an electricity fee, and saving energy.

This energy storage system is installed in a power generation station, transmission and distribution lines, and a customer site in a power system. The ESS has functions such as frequency regulation, generator output stabilization using renewable energy, peak shaving, load leveling, and emergency power supply.

The energy storage system is largely classified into a physical energy storage system and a chemical energy storage system based on an energy storage scheme. The physical energy storage system may employ pumped storage power generation, compressed air storage, and flywheel. The chemical energy storage system may employ a lithium ion battery, a lead acid battery, or a Nas battery.

However, a conventional energy storage system may not associate a power state of an area (for example, a microgrid unit) or a building which is directly managed by the system with a power state of an area or a building adjacent thereto, and thus may not manage the former and the latter in an integrated manner.

Accordingly, when the adjacent areas or buildings have different peak control timings, different power generation plans are required to control different power demand and supply states of the adjacent areas or buildings.

Further, the conventional energy storage system should solve an abnormal power state of an area (for example, a microgrid unit) or a building which is directly managed by the system by itself.

Accordingly, when the energy storage system does not have an UPS (Uninterruptible Power Supply) structure, uninterruptible power supply is not available. Alternatively, when an emergency generator such as a diesel generator is not disposed in the area or the building, power outage or power shortage may not be solved in the area or the building on its own.

Moreover, when a specific area or building does not have an energy management system such as an energy storage system, power outage or power shortage in the area or building may not be solved on its own.

BRIEF SUMMARY OF THE INVENTION

A purpose of the present disclosure is to provide a hierarchical power control system capable of configuring an optimal integrated operation schedule based on a power demand and supply state of at least one microgrid cell.

Another purpose of the present disclosure is to provide a hierarchical power control system in which when power outage occurs in a normal cell or an internal load therein is in a power shortage state, the power supply shortage may be solved by temporarily converting the normal cell into a premium cell.

Still another purpose of the present disclosure is to provide a hierarchical power control system in which when power outage occurs in a virtual cell or an internal load therein is in a power shortage state, the power supply shortage may be solved by temporarily adding an ESS function to the virtual cell.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

One embodiment of the present disclosure provides a hierarchical power control system connected to the cloud server, the system comprising: a first microgrid cell including a first energy storage system (ESS) having an uninterruptible power supply (UPS) structure, and a first load whose a power state is managed by the first ESS; a second microgrid cell including a second load and a second ESS for managing a power state of the second load; a third microgrid cell including a third load; an emergency cell including an additional ESS having an UPS structure, and an additional emergency generator, wherein the emergency cell is selectively connected to the second microgrid cell; a middleware server communicating with the first to third microgrid cells and the emergency cell; and an integrated control system configured to: receive a power demand and supply state information of each of the first to third microgrid cells via the middleware server; and configure an integrated operation schedule based on the received power demand and supply state information of each of the first to third microgrid cells.

When an abnormal power state occurs in the second microgrid cell, the integrated control system is configured to: calculate a power shortage amount of the second microgrid cell based on the power demand and supply state information of the second microgrid cell received from the middleware server, and determine a power supply amount based on the power shortage amount; generate a control signal including information on the determined power supply amount; transmit the generated control signal to the emergency cell via the middleware server; and connect the emergency cell and the second microgrid cell with each other.

The control signal transmitted to the emergency cell is transmitted to the additional ESS and the additional emergency generator, wherein the additional ESS supplies power to the second load in an uninterruptible manner, based on the control signal, wherein the additional emergency generator supplies power to the second load, based on the control signal, wherein the additional ESS and the additional emergency generator are operated in association with each other, based on the control signal.

The first microgrid cell further includes a first sensor for detecting a power state of the first load, wherein the second microgrid cell further includes a second sensor for detecting a power state of the second load, wherein the third microgrid cell further includes a third sensor for detecting a power state of the third load, wherein each of the first to third sensors detects the power state of each of the first to third loads and transmits each detected power state to the cloud server.

The cloud server is configured to: receive at least one of climate data or power-related data from an external entity; analyze, in a combined manner, the power state of each of the first to third loads received from the first to third sensors, and the at least one of the climate data or power related data received from the external entity; and provide the analysis result to the middleware server.

The middleware server provides the analysis result received from the cloud server to the integrated control system, wherein the integrated control system is configured to predict an operation schedule of each of the first to third microgrid cells, based on the analysis result received from the middleware server.

The cloud server provides the power state of each of the first to third loads received from the first to third sensors to the middleware server, wherein the middleware server provides the power state of each of the first to third loads received from the cloud server to the integrated control system, wherein the integrated control system is configured to: compare the power state of each of the first to third loads received from the middleware server with the integrated operation schedule; and adjust the integrated operation schedule based on the comparison result.

The first microgrid cell further includes: an emergency generator; a building-related power system including a first distributed power system; and a first energy management system (EMS) for controlling the emergency generator, the building-related power system, and the first ESS, wherein the second microgrid cell further includes: a second distributed power system operated in association with the second ESS; and a second EMS for controlling the second ESS and the second distributed power system.

The building-related power system further includes: a building energy management system (BEMS); a distribution board communicating with the BEMS; a building automation system (BAS) communicating with the BEMS; an air conditioning system connected to the BAS; the first distributed power system connected to the BAS; and a third ESS connected to the BAS, wherein the BEMS is configured to control at least one of the air conditioning system, the first distributed power system, or the third ESS using the BAS, thereby to reduce peak load.

The integrated control system is configured to receive the power demand and supply state information via the middleware server, wherein the power demand and supply state information includes first power demand and supply state information received from the first EMS, and second power demand and supply state information received from the second EMS, wherein the first power demand and supply state information includes at least one of power amount information generated in the first microgrid cell, required power amount information therein, or operation schedule information of the first ESS, wherein the second power demand and supply state information includes at least one of power amount information generated in the second microgrid cell, required power amount information therein, or operation schedule information of the second ESS.

The integrated control system is configured to provide the integrated operation schedule to the first EMS and second EMS via the middleware server, wherein the first EMS adjusts a power supply and demand schedule of the first microgrid cell, based on the integrated operation schedule received via the middleware server, wherein the second EMS adjusts a power supply and demand schedule of the second microgrid cell, based on the integrated operation schedule received via the middleware server.

Another embodiment of the present disclosure provides a hierarchical power control system connected to the cloud server, the system comprising: a first microgrid cell including a first energy storage system (ESS) having an uninterruptible power supply (UPS) structure, and a first load whose a power state is managed by the first ESS; a second microgrid cell including a second load, and a second ESS for managing a power state of the second load; a third microgrid cell including a third load; a fourth microgrid cell including a fourth load, and a third ESS managing a power state of the fourth load; an emergency cell including an additional ESS having an UPS structure, and an additional emergency generator, wherein the emergency cell is selectively connected to at least one of the second microgrid cell or the fourth microgrid cell; a middleware server communicating with the first to fourth microgrid cells and the emergency cell; and an integrated control system configured to: receive a power demand and supply state information of each of the first to fourth microgrid cells via the middleware server; and configure an integrated operation schedule based on the received power demand and supply state information of each of the first to fourth microgrid cells.

Then an abnormal power state occurs in the second and fourth microgrid cells, the integrated control system is configured to: calculate a first power shortage amount of the second microgrid cell based on the power demand and supply state information of the second microgrid cell received from the middleware server, and determine a first power supply amount based on the first power shortage amount; calculate a second power shortage amount of the fourth microgrid cell based on the power demand and supply state information of the fourth microgrid cell received from the middleware server, and determine a second power supply amount based on the second power shortage amount; generate a first control signal including information on the determined first power supply amount, and a second control signal including information on the determined second power supply amount; provide the generated first and second control signals to the emergency cell via the middleware server; and connect the second and fourth microgrid cells with the emergency cell.

The first and second control signals provided to the emergency cell are transmitted to the additional ESS and the additional emergency generator, wherein the additional ESS supplies power in an uninterruptible manner to the second and fourth loads, respectively, based on the first and second control signals, wherein the additional emergency generator supplies power to the second and fourth loads, respectively, based on the first and second control signals, wherein the additional ESS and the additional emergency generator are operated in association with each other, based on the first and second control signals.

Still another embodiment of the present disclosure provides a hierarchical power control system connected to the cloud server, the system comprising: a first microgrid cell including a first energy storage system (ESS) having an uninterruptible power supply (UPS) structure, and a first load whose a power state is managed by the first ESS; a second microgrid cell including a second load and a second ESS for managing a power state of the second load; a third microgrid cell including a third load; an emergency cell including an additional ESS, wherein the emergency cell is selectively connected to the third microgrid cell; a middleware server communicating with the first to third microgrid cells and the emergency cell; and an integrated control system configured to communicate with the middleware server, and to control power demand and supply of each of the first to third microgrid cells based on the communication result.

The first microgrid cell further includes a first sensor for detecting a power state of the first load, wherein the second microgrid cell further includes a second sensor for detecting a power state of the second load, wherein the third microgrid cell further includes a third sensor for detecting a power state of the third load, wherein each of the first to third sensors detects the power state of each of the first to third loads and transmits each detected power state to the cloud server, wherein the cloud server provides the power state of each of the first to third loads received from the first to third sensors to the middleware server, wherein the middleware server provides the power state of each of the first to third loads received from the cloud server to the integrated control system.

When an abnormal power state occurs in the third microgrid cell, the integrated control system is configured to: calculate a power shortage amount of the third microgrid cell based on the power demand and supply state information of the third microgrid cell received from the middleware server, and determine a power supply amount based on the power shortage amount; generate a control signal including information on the determined power supply amount; transmit the generated control signal to the emergency cell via the middleware server; and connect the emergency cell and the third microgrid cell with each other.

The control signal transmitted to the emergency cell is transmitted to the additional ESS, wherein the additional ESS supplies power to the third load based on the control signal.

The cloud server is configured to: receive at least one of climate data or power-related data from an external entity; analyze, in a combined manner, the power state of each of the first to third loads received from the first to third sensors, and the at least one of the climate data or power related data received from the external entity; and provide the analysis result to the middleware server.

The middleware server provides the analysis result received from the cloud server to the integrated control system, wherein the integrated control system is configured to predict an operation schedule of each of the first to third microgrid cells, based on the analysis result received from the middleware server.

Each of the first to third microgrid cells transmits each power demand and supply state information to the integrated control system via the middleware server, wherein the integrated control system configures an integrated operation schedule based on the power demand and supply state information of each of the first to third microgrid cells received via the middleware server.

the integrated control system is configured to: compare the power state of each of the first to third loads received from the middleware server with the integrated operation schedule; and adjust the integrated operation schedule based on the comparison result.

The first microgrid cell further includes: an emergency generator; a first building-related power system including a first distributed power system; and a first energy management system (EMS) for controlling the emergency generator, the first building-related power system, and the first ESS, wherein the second microgrid cell further includes: a second distributed power system operated in association with the second ESS; and a second EMS for controlling the second ESS and the second distributed power system.

The first building-related power system further includes: a building energy management system (BEMS); a distribution board communicating with the BEMS; a building automation system (BAS) communicating with the BEMS; an air conditioning system connected to the BAS; the first distributed power system connected to the BAS; and a third ESS connected to the BAS, wherein the BEMS is configured to control at least one of the air conditioning system, the first distributed power system, or the third ESS using the BAS, thereby to reduce a peak load of the first load.

The first EMS transmits first power demand and supply state information to the integrated control system via the middleware server, wherein the second EMS transmits second power demand and supply state information to the integrated control system via the middleware server, wherein the third sensor transmits third power demand and supply state information to the integrated control system via the cloud server and then via the middleware server, wherein the integrated control system is configured to configure an integrated operation schedule based on the first to third power demand and supply state information received via the middleware server, wherein the first power demand and supply state information includes at least one of power amount information generated in the first microgrid cell, required power amount information therein, or operation schedule information of the first ESS, wherein the second power demand and supply state information includes at least one of power amount information generated in the second microgrid cell, required power amount information therein, or operation schedule information of the second ESS, wherein the third power demand and supply state information includes power amount information required in the third microgrid cell.

The integrated control system is configured to provide the integrated operation schedule to the first and second EMS via the middleware server, wherein the first EMS adjusts a power supply and demand schedule of the first microgrid cell based on the integrated operation schedule received via the middleware server, wherein the second EMS adjusts a power supply schedule of the second microgrid cell based on the integrated operation schedule received via the middleware server.

The emergency cell includes a second building-related power system including the additional ESS, wherein the second building-related power system further includes: an additional BEMS; an additional distribution board communicating with the additional BEMS; an additional BAS communicating with the additional BEMS and connected to the additional ESS; an additional air conditioning system connected to the additional BAS; and an additional distributed power system connected to the additional BAS.

When the emergency cell and the third microgrid cell are connected to each other, the additional BEMS controls at least one of the additional air conditioning system, the additional distributed power system, or the additional ESS using the additional BAS, thereby to reduce a peak load amount of the third load.

Still another embodiment of the present disclosure provides a hierarchical power control system connected to the cloud server, the system comprising: a first microgrid cell including a first ESS having a UPS structure, and a first load whose a power state is managed by the first ESS; a second microgrid cell including a second load, and a second ESS for managing a power state of the second load; a third microgrid cell including a third load; a fourth microgrid cell including a fourth load; an emergency cell including an additional ESS, wherein the emergency cell is selectively connected to at least one of the third microgrid cell or the fourth microgrid cell; a middleware server communicating with the first to fourth microgrid cells and the emergency cell; and an integrated control system configured to communicate with the middleware server, and to control power demand and supply of each of the first to fourth microgrid cells based on the communication result.

The first microgrid cell further includes a first sensor for detecting a power state of the first load, wherein the second microgrid cell further includes a second sensor for detecting a power state of the second load, wherein the third microgrid cell further includes a third sensor for detecting a power state of the third load, wherein the fourth microgrid cell further includes a fourth sensor for detecting a power state of the fourth load, wherein each of the first to fourth sensors detects the power state of each of the first to fourth loads and transmits each detected power state to the cloud server, wherein the cloud server provides the power state of each of the first to fourth loads received from the first to fourth sensors to the middleware server, wherein the middleware server provides the power state of each of the first to fourth loads received from the cloud server to the integrated control system.

When an abnormal power state occurs in the third and fourth microgrid cells, the integrated control system is configured to: calculate a first power shortage amount of the third load based on the power state of the third load received from the middleware server, and determine a first power supply amount based on the first power shortage amount; calculate a second power shortage amount of the fourth load based on the power state of the fourth load received from the middleware server, and determine a second power supply amount based on the second power shortage amount; generate a first control signal including information on the determined first power supply amount, and a second control signal including information on the determined second power supply amount; provide the generated first and second control signals to the emergency cell via the middleware server; and connect the fourth and fourth microgrid cells with the emergency cell.

The first and second control signals provided to the emergency cell are transmitted to the additional ESS, wherein the additional ESS supplies power to the third and fourth loads based on the first and second control signals.

In accordance with the present disclosure, the integrated control system may configure the optimal integrated operation schedule based on the power demand and supply state of at least one microgrid cell and, thus, may manage the power demand and supply states of microgrid cells adjacent thereto in an integrated and efficient manner.

Further, according to the present disclosure, when the load in the normal cell is in a power shortage state, the integrated control system may temporarily connect the additional ESS and the additional emergency generator to the normal cell and thus convert the normal cell into the premium cell, thereby to solve the power supply shortage. In addition, when power outage occurs in the normal cell, the integrated control system may connect the additional ESS and the additional emergency generator to the normal cell to stably supply power in an uninterruptible manner to solve the power outage.

Further, according to the present disclosure, when the load in the virtual cell is in a power shortage state, the integrated control system may temporarily connect the additional ESS to the corresponding virtual cell, such that the power supply shortage problem may be solved. In addition, when power outage occurs in the virtual cell, the integrated control system may connect the additional ESS to the corresponding virtual cell to stably supply power in an uninterruptible manner to solve the power outage.

BRIEF DESCRIPTIONS OF DRAWINGS

FIG. 1 is a schematic diagram illustrating a hierarchical power control system according to an embodiment of the present disclosure.

FIG. 2 is a schematic diagram illustrating first to third microgrid cells in FIG. 1.

FIG. 3 is a schematic diagram illustrating the first microgrid cell in FIG. 2.

FIG. 4 is a schematic diagram illustrating a hierarchical power control system according to another embodiment of the present disclosure.

FIG. 5 is a schematic diagram illustrating a hierarchical power control system according to another embodiment of the present disclosure.

FIG. 6 is a schematic diagram illustrating first to third microgrid cells in FIG. 5.

FIG. 7 is a schematic diagram illustrating the first microgrid cell in FIG. 6.

FIG. 8 is a schematic diagram illustrating a second building-related power system in FIG. 6.

FIG. 9 is a schematic diagram illustrating a hierarchical power control system according to another embodiment of the present disclosure.

DETAILED DESCRIPTION OF THE INVENTION

The above-described purposes, features and advantages will be described in detail below with reference to the accompanying drawings. Accordingly, a person with ordinary skill in a technical field to which the present disclosure belongs may easily implement an technical idea of the present disclosure. In describing the present disclosure, when it is determined that a specific description of a known element related to the present disclosure may unnecessarily obscure a gist of the present disclosure, detailed descriptions thereof may be omitted. Hereinafter, preferred embodiments of the present disclosure will be described in detail with reference to the accompanying drawings. In the drawings, the same reference numerals are used to indicate the same or similar components.

Hereinafter, a hierarchical power control system according to an embodiment of the present disclosure will be described with reference to FIG. 1 to FIG. 3.

FIG. 1 is a schematic diagram illustrating a hierarchical power control system according to an embodiment of the present disclosure. FIG. 2 is a schematic diagram illustrating first to third microgrid cells in FIG. 1. FIG. 3 is a schematic diagram illustrating the first microgrid cell in FIG. 2.

For reference, the reference numerals shown in FIG. 1 to FIG. 3 are only applied to FIG. 1 to FIG. 3.

Referring to FIG. 1 and FIG. 2, a hierarchical power control system 1 according to an embodiment of the present disclosure may include an integrated control system 100, a middleware server 200, a first microgrid cell 300, that is, a premium cell, a second microgrid cell 400, that is, a normal cell, a third microgrid cell 500, that is, a virtual cell, and an emergency cell 900.

For reference, the hierarchical power control system 1 in FIG. 1 may further include a cloud server 600. As used herein, for convenience of illustration, an example in which the hierarchical power control system 1 does not include the cloud server 600 will be set forth.

Further, although not shown in the drawing, the hierarchical power control system 1 in FIG. 1 may further include a power system. In this connection, each power system may be connected to each of the first to third microgrid cells 300, 400, and 500. Alternatively, a only one power system may be commonly connected to the first to third microgrid cells 300, 400, and 500.

Further, the power system may include a power plant, a substation, a transmission line, and the like.

The integrated control system 100 may receive power demand and supply state information of the first to third microgrid cells 300, 400, and 500 via the middleware server 200, and may configure an integrated operation schedule based on the received power demand and supply state information of the first to third microgrid cells 300, 400, and 500. Further, the integrated control system 100 may provide the configured integrated operation schedule to the first to third microgrid cells 300, 400, and 500 via the middleware server 200, such that a power supply and demand schedule of each of the first to third microgrid cells 300, 400, and 500 may be adjusted based on the configured integrated operation schedule.

Specifically, the integrated control system 100 may be designed to have an integrated monitoring and control function and an optimal power generation and control function.

The integrated monitoring and control function may include, for example, a monitoring function, a control function, a reporting function, an alarming function, a calculation function, a database management function, a trend function, and a display function.

In this connection, the monitoring function may include a state/fault monitoring and measurement function of each of the first to third microgrid cells 300, 400, and 500. The control function may include operation/stop/scheduling and optimal operation control functions of facilities disposed in each of the first to third microgrid cells 300, 400, and 500.

The reporting function may include a function of providing period-based measurement information and manipulation/maintenance records of each of the first to third microgrid cells 300, 400, and 500. The alarming function may include an alarm recognition processing and storage function.

The calculation function may apply a calculation or a function to data such as power factor. The DB management function may include a data interface function via a realtime database API (Application Program Interface).

The trend function may monitor a trend of data change. The display function may include a function of displaying a monitoring result, an event, an alarm, an authority, etc. on a screen, for example, a screen of the integrated control system 100 or a screen of a mobile terminal 800 linked thereto via the cloud server 600.

In one example, the optimal power generation and control functions may include, for example, a load prediction function, a solar power generation prediction function, an optimal power generation plan configuration function, an economic power supply function, an automatic power generation control function, a bill estimation function, a load blocking function, and an islanding algorithm execution function.

In this connection, the load prediction function may a function of applying an ensemble multi-model combination algorithm that derives a result using various prediction algorithms, and a function of obtaining historical data of a load in the power system and storing the same in an Oracle DB.

The solar power prediction function may include a function of patterning a probability of precipitation based on precipitation information received from an external entity 700, for example, KMA (Korean Meteorological Administration) via the cloud server 600 and predicting an amount of power generation using based on the patterned probability using a K-mean Cluster scheme, and a function of designing an algorithm in a distinguished manner between the Korea Meteorological Administration information related and unrelated predictions.

The optimal power generation plan configuration function may include a function of configuring an optimal power generation plan in consideration of the power supply and demand states of the first to third microgrid cells 300, 400, and 500. Details thereof will be described later.

The economic power supply function may include a function of determining an output of a thermal/electrical energy source relative to an energy source operated as a result of the optimal power generation plan and dividing the output into outputs for microgrid cells.

The automatic power generation control function may include a function of designing an algorithm to pursue purposes of a power system connected mode (for maintaining a connected power flow) and an independent operation mode (for maintaining a frequency).

The bill estimation function may include a function of calculating an electricity bill based on electricity usage history data.

The load blocking function may include a function of blocking the load based on a priority when a current value exceeds a reference value.

The islanding algorithm execution function may include a function of searching for a power swapping and load blocking scheme during an independent operation.

The integrated control system 100 may receive various information from the middleware server 200 and may control the power demand and supply states of the first to third microgrid cells 300, 400 and 500 in an integrated manner based on the received information.

Details thereof will be described later.

In one example, the integrated control system 100 may selectively connect the second microgrid cell 400 and the emergency cell 900 with each other.

Specifically, when an abnormal power state, for example, a power outage state of the power system or a power shortage state of a second load 450 occurs in the second microgrid cell 400, the integrated control system 100 may connect the second microgrid cell 400 and the emergency cell 900 with each other.

In this connection, the second microgrid cell 400 and the emergency cell 900 may be selectively connected to each other, for example, via a conversion switch (not shown). The conversion switch may be operated by the integrated control system 100.

The conversion switch may normally block connection between the second microgrid cell 400 and the emergency cell 900. When a problem such as the power outage of the power system or the power shortage of the second load occurs, the conversion switch may enable the connection between the second microgrid cell 400 and the emergency cell 900, such that power of the emergency cell 900 is transmitted to the second microgrid cell 400.

Further, the conversion switch may be embodied as, for example, one of TS (Transfer Switch), STS (Static Transfer Switch), a back-to-back converter, and ALTS (Automatic Load Transfer Switch). Depending on a situation, an AC-DC converter or a DC-AC converter may be installed at each of both ends of the conversion switch to change an AC voltage to a DC voltage or a DC voltage to an AC voltage.

In this way, the second microgrid cell 400 and the emergency cell 900 may be selectively connected to each other via the conversion switch operated by the integrated control system 100.

Further, the integrated control system 100 may calculate a power shortage amount of the second microgrid cell 400 based on the power demand and supply state information of the second microgrid cell 400 received from the middleware server 200, and may determine a power supply amount thereto based on the power shortage amount, and may generate a control signal including information on the determined power supply amount.

Further, the integrated control system 100 may provide the generated control signal to the emergency cell 900 via the middleware server 200. The control signal provided to the emergency cell 900 may be transmitted to an additional ESS 910 and an additional emergency generator 930 included in the emergency cell 900. In this connection, the control signal may be transferred to the conversion switch such that the conversion switch is turned on or off Thus, the second microgrid cell 400 and the emergency cell 900 may be connected to each other.

When, as described above, the control signal is transmitted to the additional ESS 910 and the additional emergency generator 930, the additional ESS 910 may supply the power to the second load 450 in an uninterruptible manner based on the control signal, and the additional emergency generator 930 may supply the power to the second load 450 based on the control signal.

For reference, the additional ESS 910 may have an UPS (Uninterruptible Power Supply) structure and may supply the power to the second load 450 in the uninterruptible manner. The additional ESS 910 and the additional emergency generator 930 may operate in association with each other based on the control signal.

More detailed information about the emergency cell 900 will be described later.

The middleware server 200 may communicate with the first to third microgrid cells 300, 400, and 500 and the emergency cell 900.

For reference, the middleware server 200 may be a separate component or may be included in the integrated control system 100. In the latter case, the integrated control system 100 may directly communicate with the first to third microgrid cells 300, 400, and 500, the emergency cell 900 or the cloud server 600.

However, for convenience of illustration, an example in which the middleware server 200 is a separate component from the integrated control system 100 will be described herein.

Specifically, the middleware server 200 may provide the power demand and supply state information, that is, real-time power status information received from the first to third microgrid cells 300, 400, and 500 to the integrated control system 100, and may provide a control command or signal, for example, an integrated operation schedule received from the integrated control system 100 to the first to third microgrid cells 300, 400, and 500.

Further, the middleware server 200 may receive an analysis result from the cloud server 600.

For reference, the cloud server 600 may receive at least one of climate data and power-related data from the external entity 700 (for example, Korea Meteorological Administration or Korea Power Corporation) and may receive power states of first to third loads 350, 450, and 550 from the first to third sensors 320, 420, and 520, respectively.

Further, the cloud server 600 may analyze the power states of the first to third loads 350, 450, and 550 received from the first to third sensor 320, 420, and 520, and at least one of the climate data and the power-related data received from the outside in a combined manner, and then may supply an analysis result to the middleware server 200.

That is, the middleware server 200 may provide the analysis result received from the cloud server 600 and the power demand and supply state information received from the first to third microgrid cells 300, 400, and 500, respectively, to the integrated control system 100.

Thus, the integrated control system 100 may use the analysis results received from the middleware server 200 and the power demand and supply state information of the first to third microgrid cells 300, 400, and 500 to control power demand and supply states of the first to the third microgrid cells 300, 400, and 500 in an integrated manner.

Further, even when the integrated control system 100 does not receive the power demand and supply state information of the first to third microgrid cells 300, 400, and 500, the integrated control system 100 may predict an operation schedule of each of the first to third microgrid cells 300, 400, and 500, based on the analysis result received from the middleware server 200.

In another example, the integrated control system 100 may adjust the integrated operation schedule based on the analysis result received from the middleware server 200 or based on the power demand and supply state information of the first to third microgrid cells 300, 400, and 500.

In one example, the cloud server 600 may provide the power states of the first to third loads 350, 450, and 550 from the first to third sensor 320, 420, 520 to the middleware server 200. The middleware server 200 may provide the power states of the first to third load 350, 450, and 550 received from the cloud server 600 to the integrated control system 100.

Accordingly, the integrated control system 100 may compare the power states of the first to third load 350, 450, and 550 received from the middleware server 200 with the integrated operation schedule, and may adjust the integrated operation schedule based on the comparison result.

Further, the cloud server 600 may be linked with the mobile terminal 800, and thus may transmit power-related information to the mobile terminal 800, so that an user may receive the power state of each of the first to third microgrid cells 300, 400, and 500 via the mobile terminal 800 in real time.

The first microgrid cell 300 may include a first ESS (energy storage system) 360 having a UPS structure and the first load 350 whose the power state is managed by the first ESS 360.

Specifically, referring to FIG. 2 and FIG. 3, the first microgrid cell 300 may include a first EMS (energy management system) 310, a first sensor 320, an emergency generator 330, a first ESS 360, a building-related power system 390, and the first load 350.

For reference, the first microgrid cell 300 may not include an emergency generator 330. In this case, in an event of power outage or power recovery of the power system, the first ESS 360 equipped with the UPS structure may supply the power to the first load 350 in an uninterruptible manner.

However, for convenience of illustration, an example in which the first microgrid cell 300 includes the emergency generator 330 may be set forth herein.

The first EMS 310 may control the emergency generator 330 and the first ESS 360.

Specifically, the first EMS 310 may be configured to manage all of the components included in the first microgrid cell 300, that is, the first load 350, the first sensor 320, the emergency generator 330, the first ESS 360, and the building-related power system 390.

Further, the first EMS 310 may communicate with the middleware server 200 and thus may transmit power related data (e.g., first power demand and supply state information) of the first microgrid cell 300 to the middleware server 200 or may receive a control signal or command of the integrated control system 100 from the middleware server 200.

In this connection, the first power demand and supply state information may include, for example, at least one of power amount information generated in the first microgrid cell 300, required power amount information thereof, and operation schedule information of the first ESS 360.

For reference, the first EMS 310 may generate information on maintenance and repair of a battery 366 based on data on the battery 366 received from a power management system (PMS) 362 and thus may provide the maintenance and repair information regarding the battery 366 via the PMS 362 to a battery management system (BMS) 368 that manages the battery 366.

The first sensor 320 may detect the power state of the first load 350.

Specifically, the first sensor 320 may be embodied as, for example, an IoT sensor having a communication function. The first sensor 320 may detect the power state, for example, the power shortage state, the power excess state, and the like of the first load 350 and may provide the detected information to the cloud server 600.

The emergency generator 330 may be operated by the first EMS 310 during the power outage of the power system.

Specifically, the emergency generator 330 may be embodied as, for example, a diesel generator. The emergency generator 330 may operate in association with the first ESS 360. Thus, when the power outage of the power system occurs, an uninterruptible independent operation of the first microgrid cell 300 may be maintained for a specific time duration, for example, 4 hours.

For reference, the emergency generator 330 may employ a conventional diesel generator. A small capacity ESS may be used as the first ESS 360. Thus, an initial investment cost may be reduced. Further, a long or unlimited independent operation may be realized using the emergency generator 330. Thus, reliability of power supply and demand may be secured, and a planned independent operation may be realized, such that financial benefit may be secured via peak load reduction.

The first ESS 360 may be equipped with the UPS structure, and thus may be designed to perform an uninterruptible and independent operation in event of an accident such as the power outage, thereby enabling reliable power supply.

Specifically, the first ESS 360 having the UPS structure may supply the power to the first load 350 in event of the power outage of the power system or of the power recovery thereof in the uninterruptible manner, and may manage the power state of the first load 350.

In this connection, the first ESS 360 may include PMS 362, PCS (power conditioning system) 364, a battery 366, and BMS (battery management system) 368.

The PCS 364 may store the power generated in a distributed power system (for example, a renewable energy system using a solar or wind energy) (not shown) in the battery 366 or transfer the power to the power system or the first load 350. Further, the PCS 364 may transmit the power stored in the battery 366 to the power system or the first load 350. The PCS 364 may store the power supplied from the power system to the battery 366.

Further, the PCS 364 may control charging and discharging of the battery 366 based on a state of charge of the battery 366 hereinafter referred to as "SOC level".

For reference, the PCS 364 may generate a schedule for an operation of the first ESS 360 based on a power price of a power market, a power generation plan of the distributed power system, an amount of power generation, and a power demand of the power system.

The battery 366 may be charged or discharged by the PCS 364.

Specifically, the battery 366 may receive and store at least one of the power of the distributed power system or the power of the power system, and may supply the stored power therein to at least one of the power system or the first load 350. The battery 366 may be composed of at least one battery cell. Each battery cell may include a plurality of bare cells.

The BMS 368 may monitor the state of the battery 366, and may control the charging and discharging operation of the battery 366. Further, the BMS 368 may monitor the state of the battery 366 including the SOC level. The monitored state of the battery 366, for example, voltage, current, temperature, residual power amount, lifespan, charging state, etc., may be provided from the BMS 368 to the PCS 364.

Further, the BMS 368 may perform a protection operation to protect the battery 366. For example, the BMS 368 may perform at least one of an overcharge protection function, an excessive discharge protection function, an overcurrent protection function, an overvoltage protection function, an overheat protection function, and a cell balancing function for the battery 366.

Further, the BMS 368 may adjust the SOC level of the battery 366.

Specifically, the BMS 368 may receive a control signal from the PCS 364, and may adjust the SOC level of the battery 366 based on the received signal.

The PMS 362 may control the PCS 364 based on data related to the battery 366 received from the BMS 368.

Specifically, the PMS 362 may monitor the state of the battery 366, and monitor the state of the PCS 364. That is, the PMS 362 may control the PCS 364 in terms of an efficiency based on the data related to the battery 366 received from the BMS 368.

Further, the PMS 362 may monitor the state of the battery 366 via the BMS 368 and provide the collected battery-related data to the first EMS 310.

The building-related power system 390 may include a BEMS (building energy management system) 392, a distribution board 398, a BAS (building automation system) 393, an air conditioning system 394, a first distributed power system 395, a third ESS 396.

Specifically, the BEMS 392 may control at least one of an air conditioning system 394, the first distributed power system 395, or the third ESS 396 via the BAS 393 to reduce the peak load and may control the distribution board 398.

Further, the distribution board 398 and the BAS 393 may communicate with the BEMS 392 and may be controlled by the BEMS. The air conditioning system 394, the first distributed power system 395, and the third ESS 396 may be connected to the BAS 393 and thus may be controlled by the BEMS 392.

The building-related power system 390 may be optimally controlled for energy saving, thereby reducing energy cost and peak load.

The power state of the first load 350 may be managed by the first ESS 360. For example, the first load 350 may include a home, a large building, factory, and the like.

Specifically, the power supply and demand of the first load 350 may be managed by at least one of the first ESS 360, the emergency generator 330, or the building-related power system 390. The first load 350 may be connected to the first sensor 320.

For reference, the first load 350 may be an important load that requires a high-quality power supply in an uninterruptible manner, for example, a laboratory building, a hospital, or the like.

Accordingly, when configuring the integrated operation schedule of the integrated control system 100, a priority of the first load 350, that is, a importance level thereof may be higher than a priority of each of the second load 450 and the third load 550, that is, a importance level thereof.

The second microgrid cell 400 may include a second load 450 and a second ESS 460 that manages the power state of the second load 450. Further, the second microgrid cell 400 may be connected to the emergency cell 900 during the power shortage or the power outage of the power system, as described above, so that the power may be supplied from the emergency cell 900 thereto. Details thereof will be omitted.

Specifically, the second microgrid cell 400 may include a second EMS 410, a second sensor 420, the second load 450, and the second ESS 460.

For reference, although not shown in the drawing, the second microgrid cell 400 may further include a second distributed power system (not shown) such as a renewable energy system using wind energy or solar energy that is operated in association with the second ESS 460.

The second EMS 410 may control the second ESS 460 and the second distributed power system.

Specifically, the second EMS 410 may serve to manage all of the components included in the second microgrid cell 400, that is, to manage all of the second sensor 420, the second load 450, the second ESS 460, and the second distributed power system.

Further, the second EMS 410 may communicate with the middleware server 200, and thus transmit the power related data of the second microgrid cell 400, for example, the second power demand and supply state information thereof to the middleware server 200 or may receive a control signal or command of the integrated control system 100 from the middleware server 200.

In this connection, the second power demand and supply state information may include, for example, at least one of power amount information that may be generated in the second microgrid cell 400, required power amount information thereof, or operation schedule information of the second ESS 460.

The second sensor 420 may detect the power state of the second load 450.

Specifically, the second sensor 420 may be embodied as, for example, an IoT sensor equipped with a communication function and may detect the power state of the second load 450, for example, the power shortage state, the power excess state, and the like thereof and may transmit the detected information by the cloud server 600.

The power state of the second load 450 may be managed by the second ESS 460. For example, the second load 450 may include homes, large buildings, factories, and the like.

Specifically, the power supply and demand of the second load 450 may be managed by the second ESS 460. the second load 450 may be connected to the second sensor 420.

For reference, the second load 450 may be a general load that requires energy efficiency via connection with the second distributed power system, and may be, for example, a classroom building, a dormitory, and the like. Further, the second load 450 may include at least one of loads 450a to 450c having different priorities. Therefore, during peak control, a load with the highest priority among the second loads 450 may receive the power, and the power may be prevented from being supplied to a load with the lowest priority among the second loads 450. During peak control, the load, for example, the load 450a, with the highest priority among the second loads 450 may receive the power, but the power may be prevented from being supplied to the load, for example, the load 450b or 450c with the lowest priority among the second loads 450.

In summary, the second microgrid cell 400 may include loads that need to be selectively operated based on characteristics or priorities when an event such as the peak control occurs.

Accordingly, even when the second load 450 receives the power from the emergency cell 900, some loads, for example, the load 450a may receive the power first depending on the characteristics or priority.

The second ESS 460 may manage the power state of the second load 450, and may perform the peak control function.

Further, the second ESS 460 may include the PMS, the battery, the BMS, and the PCS, as in the first ESS 360 as described above. However, detailed descriptions thereof will be omitted.

The third microgrid cell 500 may include a third load 550.

Specifically, the third microgrid cell 500 may include a third sensor 520 and a third load 550.

For reference, unlike the second microgrid cell 400, the third microgrid cell 500 may not have an EMS, an ESS, or a distributed power system. Accordingly, the power demand and supply state information of the third microgrid cell 500 may be transmitted to the middleware server 200 via the cloud server 600 via the third sensor 520.

In another example, the third sensor 520 of the third microgrid cell 500 communicates with the middleware server 200 and thus directly transmits the power state of the third load 550 to the middleware server 200.

The third sensor 520 may detect the power state of the third load 550.

Specifically, the third sensor 520 may be embodied as, for example, an IoT sensor equipped with a communication function, and thus may detect the power state of the third load 550, for example, power shortage state, power excess state, etc., and may provide the detected information to the cloud server 600.

The third load 550 may include, for example, a home, a large building, and a factory.

Specifically, the third load 550 may be connected to the third sensor 520.

For reference, the third load 550 may be a general load without connection to a distributed power system. This may intend to provide an analysis based energy reduction service via the third sensor 520. For example, this may intend to transmit the power state information of the third load 550 to the cloud server 600 such that the user may check the power state of the third load 550 in real time using a mobile terminal 800 that communicates with the cloud server 600.

The emergency cell 900 may include an additional ESS 910 with an UPS structure, as described above, and an additional emergency generator 930 and may be selectively connected to the second microgrid cell 400.

Specifically, the additional emergency generator 930 may be embodied as, for example, a diesel generator. The additional emergency generator 930 may be operated in association with an additional ESS 910. Thus, in the power shortage of the second load 450 or a power outage of the second microgrid cell 400, an uninterruptible independent operation of the second microgrid cell 400 may be performed for a specific time duration, for example, a duration for which the second microgrid cell 400 and the emergency cell 900 are connected to each other.

For reference, the additional emergency generator 930 may employ a conventional diesel generator. A small capacity ESS may be used as the additional ESS 910, such that an initial investment cost may be reduced. Further, a long or unlimited independent operation of the emergency cell 900 may be realized using the additional emergency generator 930. Thus, reliability of power supply and demand thereof may be secured. Enabling a planned independent operation may secure economic efficiency via peak load reduction.

In another example, the emergency cell 900 may not include the additional emergency generator 930. In this case, in an event of power shortage of the second load 450 or power outage of the second microgrid cell 400, the additional ESS 910 equipped with a UPS structure may supply the power to the second load 450 in an uninterruptible manner.

However, for convenience of illustration, an example in which the emergency cell 900 includes the additional emergency generator 930 will be described herein.

The additional ESS 910 may have a UPS structure, and may be designed to enable an uninterruptible independent operation in event of an accident such as power shortage of the second load 450 or power outage of the second microgrid cell 400, thereby enabling reliable power supply.

Specifically, the additional ESS 910 may use the UPS structure to supply the power to the second load 450 in an uninterruptible manner in an event of power shortage of the second load 450 or power outage of the second microgrid cell 400.

Further, the additional ESS 910 may include a PMS, a battery, a BMS, and a PCS, as in the first ESS 360 as described above, but detailed descriptions thereof will be omitted.

For reference, although not shown in the drawings, the emergency cell 900 may further include a distributed power system (not shown) operated in connection with the additional ESS 910. The distributed power system may include, for example, a renewable energy system using wind or solar energy.

As described above, in accordance with the present disclosure, the integrated control system 100 for constituting the optimal integrated operation schedule based on the power demand and supply state of the at least one of the microgrid cells 300, 400, and 500 may control power demand and supply states of microgrid cells adjacent thereto efficiently and in an integrated manner.

Further, in accordance with the present disclosure, when the load (that is, the second load 450) in the normal cell 400, that is, in the second microgrid cell is in a power shortage state, the integrated control system 100 may connect the additional ESS 910 and the additional emergency generator 930 to the normal cell 400 to temporarily converting the normal cell into the premium cell, such that the power shortage problem may be solved. In addition, when the power outage occurs in the normal cell 400, the integrated control system 100 may connect the additional ESS 910 and the additional emergency generator 930 to the normal cell 400 to stably supply the power thereto in an uninterruptible manner, thereby removing the power outage problem.

Hereinafter, a hierarchical power control system according to another embodiment of the present disclosure will be described with reference to FIG. 4

FIG. 4 is a schematic diagram illustrating a hierarchical power control system according to another embodiment of the present disclosure.

For reference, a hierarchical power control system 2 shown in FIG. 4 has the same configuration, function, and effect as those of the hierarchical power control system 1 shown in FIG. 1, except for the number of the normal cells. A following description will focus on the difference. Further, reference numerals shown in FIG. 4 are assumed to be applied only to FIG. 4.

Referring to FIG. 4, the hierarchical power control system 2 according to another embodiment of the present disclosure may further include a fourth microgrid cell 590 which is not present in the hierarchical power control system 1 of FIG. 1. That is, the former may have a further normal cell.

Specifically, the integrated control system 100, the middleware server 200, the first to third microgrid cells 300, 400, and 500, the emergency cell 900, and the cloud server 600 included in the hierarchical power control system 2 of FIG. 4 may be the same as the integrated control system, the middleware server, the first to third microgrid cells, the emergency cell, and the cloud server of FIG. 1, respectively.

Further, the fourth microgrid cell 590 may include the same configuration and function as those of the second microgrid cell 400, and may be selectively connected to the emergency cell 900.

Specifically, the emergency cell 900 may be selectively connected to at least one of the second and fourth microgrid cells 400 and 590.

That is, in an event of the power shortage of the load included in the second microgrid cell 400, the integrated control system 100 may connect the emergency cell 900 and the second microgrid cell 400 to each other. In an event of power shortage of the load included in the fourth microgrid cell 590, the integrated control system 100 may connect the emergency cell 900 and the fourth microgrid cell 590 with each other.

In another example, when both the load included in the second microgrid cell 400 and the load included in the fourth microgrid cell 590 are in a power shortage state, the integrated control system 100 may simultaneously connect the emergency cell 900 to both the second and fourth microgrid cells 400 and 590.

For reference, the fourth microgrid cell 590 may be selectively connected to the emergency cell 900 via a separate conversion switch (not shown). The conversion switch may be operated by the integrated control system 100.

As such, the fourth microgrid cell 590 and the emergency cell 900 may be selectively connected to each other via the conversion switch operated by the integrated control system 100.

Further, the integrated control system 100 may calculate the power shortage amount of the second microgrid cell 400 based on the power demand and supply state information of the second microgrid cell 400 received from the middleware server 200, and may determine the first power supply amount, based on the power shortage amount. the integrated control system 100 may calculate the power shortage amount of the fourth microgrid cell 590 based on the power demand and supply state information of the fourth microgrid cell 590 received from the middleware server 200 and may determine the second power supply amount, based on the power shortage amount.

Moreover, the integrated control system 100 may generate a first control signal including information on the determined first power supply amount and a second control signal including information on the determined second power supply amount, and then may transmit the generated first and second control signals to the emergency cell 900 via the middleware server 200.

The first and second control signals provided to the emergency cell 900 may be transmitted to the additional ESS (not shown) (910 in FIG. 2) and to the additional emergency generator (not shown) (930 in FIG. 2). The additional ESS may supply the power to the loads included in the second and fourth microgrid cells 400 and 590, respectively, in the uninterruptible manner, based on the first and second control signals.

Further, the additional emergency generator may supply the power to the loads included in the second and fourth microgrid cells 400 and 590, respectively, based on the first and second control signals. Thus, the additional ESS and the additional emergency generator may be operated in association with each other based on the first and second control signals.

For reference, FIG. 4 shows only two normal cells, i.e., the second and fourth microgrid cells 400 and 590. However, the hierarchical power control system 2 according to another embodiment of the present disclosure may include three or more normal cells. The normal cells may be selectively connected to the emergency cell 900 to receive the power simultaneously or at different timings, from the emergency cell 900 when the power shortage or power outage occurs.

As described above, in accordance with the present disclosure, a plurality of normal cells may be temporarily converted into premium cells via the emergency cell 900. Thus, when the power shortage or power outage occurs simultaneously in different timings in multiple normal cells, this problem may be solved.

Hereinafter, a hierarchical power control system according to another embodiment of the present disclosure will be described with reference to FIG. 5 to FIG. 8.

FIG. 5 is a schematic diagram illustrating a hierarchical power control system according to another embodiment of the present disclosure. FIG. 6 is a schematic diagram illustrating first to third microgrid cells in FIG. 5. FIG. 7 is a schematic diagram illustrating the first microgrid cell in FIG. 6. FIG. 8 is a schematic diagram illustrating a second building-related power system in FIG. 6.

For reference, a hierarchical power control system 3 shown in FIG. 5 is the same as the hierarchical power control system 1 shown in FIG. 1 except for a configuration, a function, and a connection relationship of the emergency cell. Following descriptions will focus on the differences. Further, reference numerals shown in FIG. 5 to FIG. 8 are only applied to FIG. 5 to FIG. 8.

First, referring to FIG. 5 and FIG. 6, the hierarchical power control system 3 according to another embodiment of the present disclosure may include an integrated control system 100, a middleware server 200, a first microgrid cell 300, that is, a premium cell, a second microgrid cell 400, that is, a normal cell, a third microgrid cell 500, that is, a virtual cell, an emergency cell 1900, a cloud server 600, and the like.

For reference, the integrated control system 100, the middleware server 200, the first to third microgrid cells 300, 400, and 500, and the cloud server 600 included in the hierarchical power control system 3 of FIG. 5, may be the same as the integrated control system, the middleware server, the first to third microgrid cells, and the cloud server in FIG. 1, respectively.

However, the configuration, the function, and the connection relationship of the emergency cell 1900 in FIG. 5 may be different from the configuration, the function, and the connection relationship of the emergency cell in FIG. 1. The hierarchical power control system 3 in FIG. 5 will be described based on these differences.

Specifically, the integrated control system 100 may selectively connect the third microgrid cell 500 and the emergency cell 1900 with each other.

Specifically, when the third microgrid cell 500 is in the abnormal power state, for example, when the power outage of the power system or power shortage of the third load 550 occurs, the integrated control system 100 may connect the third microgrid cell 500 and the emergency cell 1900 with each other.

In this connection, the third microgrid cell 500 and the emergency cell 1900 may be selectively connected to each other, for example, via a conversion switch (not shown). The conversion switch may be operated by the integrated control system 100.

This conversion switch normally disables the connection between the third microgrid cell 500 and the emergency cell 1900. When a problem such as the power outage of the power system or power shortage occurs, the switch may enable the connection between the third microgrid cell 500 and the emergency cell 1900, such that the power of the emergency cell 1900 may be transmitted to the third microgrid cell 500.

Further, the conversion switch may be embodied as, for example, one of TS (Transfer Switch), STS (Static Transfer Switch), a back-to-back converter, and ALTS (Automatic Load Transfer Switch). Further, depending on a situation, an AC-DC converter or a DC-AC converter may be installed at each of both ends of the conversion switch to change the AC voltage to the DC voltage or the DC voltage to the AC voltage.

As such, the third microgrid cell 500 and the emergency cell 1900 may be selectively connected to each other via the conversion switch operated by the integrated control system 100.

Further, the integrated control system 100 may calculate the power shortage amount of the third load 550 based on the power state of the third load 550 received from the middleware server 200 and determine the power supply amount based on the power shortage amount, and may generate a control signal including information on the determined power supply amount.

Further, the integrated control system 100 may provide the generated control signal to the emergency cell 1900 via the middleware server 200. The control signal provided to the emergency cell 1900 may be transmitted to the additional ESS 1996 included in the emergency cell 1900. In this connection, the control signal may be transferred to the conversion switch such that the conversion switch is turned on or off. Thus, the third microgrid cell 500 and the emergency cell 1900 may be connected to each other.

When, as described above, the control signal is transmitted to the additional ESS 1996, the additional ESS 1996 may supply the power to the third load 550 based on the control signal.

For reference, when the additional ESS 1996 has the UPS (Uninterruptible Power Supply) structure, the additional ESS 1996 may supply power to the third load 550 in an uninterruptible manner.

More detailed information about the emergency cell 1900 will be described later.

The first microgrid cell 300 may include the first EMS 310, the first sensor 320, the emergency generator 330, the first ESS 360, the first building-related power system 390, and the first load 350.

For reference, the first building-related power system 390 may be the same as the building-related power system of FIG. 1 as described above.

The second microgrid cell 400 may include the second EMS 410, the second sensor 420, the second load 450, and the second ESS 460.

For reference, unlike the second microgrid cell in FIG. 1, the second microgrid cell 400 is not connected to the emergency cell 1900.

The third microgrid cell 500 may include the third sensor 520 and the third load 550. Further, as described above, the third microgrid cell 500 may be connected to the emergency cell 1900 during power shortage or the power outage of the power system, and may receive the power from the emergency cell 1900. Details thereof will be omitted.

As described above, the emergency cell 1900 may include the additional ESS 1996, and may be selectively connected to the third microgrid cell 500.

In this connection, the additional ESS 1996 may supply power to the third load 550 when power shortage of the third load 550 or power outage of the third microgrid cell 500 occurs.

Further, the additional ESS 1996 may have, for example, a UPS structure. In this case, the additional ESS 1996 may be designed to enable an uninterruptible independent operation in an event of an accident such as a power shortage of the third load 550 or a power outage of the third microgrid cell 500, thereby enabling a reliable power supply.

Further, the additional ESS 1996 may include the PMS, the battery, the BMS, and the PCS, as in the first ESS 360 as described above, but detailed descriptions thereof will be omitted.

For reference, as shown in FIG. 8, the emergency cell 1900 may include a second building-related power system 1990 including the additional ESS 1996.

Specifically, the second building-related power system 1990 may include an additional BEMS 1992, an additional distribution board 1998, an additional BAS 1993, an additional air conditioning system 1994, an additional distributed power system 1995, and an additional ESS 1996.

In this connection, the additional BEMS 1992 may control the additional distribution board 1998. Further, when the emergency cell 1900 and the third microgrid cell 500 are connected to each other, the additional BEMS 1992 may control at least one of the additional air conditioning system 1994, the additional distributed power system 1995, and the additional ESS 1996 via the additional BAS 1993 such that a peak load, for example, a peak load amount of the third load 550 may be reduced.

For reference, the additional distribution board 1998 and the additional BAS 1993 may communicate with the additional BEMS 1992 and may be controlled by the BEMS 1992. The additional air conditioning system 1994, the additional distributed power system 1995, and the additional ESS 1996 may be connected to the additional BAS 1993 and thus may be controlled by the additional BEMS 1992.

The second building-related power system 1990 may be controlled in an optimal manner for energy saving. Thus, the energy cost and the peak load of the third microgrid cell 500 may be reduced.

As described above, in accordance with the present disclosure, when a load in a virtual cell, for example, a third microgrid cell 500 is in a power shortage state, the integrated control system 100 may temporarily connect the additional ESS 1996 to the corresponding virtual cell, such that power supply shortage problem may be solved. In addition, when the power outage occurs in the virtual cell, the integrated control system 100 may connect the additional ESS 1996 to the corresponding virtual cell to stably supply the power, such that the power outage problem may be solved.

Hereinafter, a hierarchical power control system according to another embodiment of the present disclosure will be described with reference to FIG. 9.

FIG. 9 is a schematic diagram illustrating a hierarchical power control system according to another embodiment of the present disclosure.

For reference, a hierarchical power control system 4 shown in FIG. 9 has the same configuration, function, and effect as those of the hierarchical power control system 3 shown in FIG. 5 except for the number of the virtual cells. Following descriptions will focus on the differences. Further, the reference numerals shown in FIG. 9 are only applied to FIG. 9.

Referring to FIG. 9, the hierarchical power control system 4 according to another embodiment of the present disclosure may further include a virtual cell, that is, a fourth microgrid cell 590 which is not present in the hierarchical power control system 3 of FIG. 5.

Specifically, the integrated control system 100, the middleware server 200, the first to third microgrid cells 300, 400, and 500, the emergency cell 1900, and the cloud server 600 included in hierarchical power control system 4 of FIG. 9 may be the same as the integrated control system, the middleware server, the first to third microgrid cells, the emergency cell, and the cloud server in FIG. 5 respectively.

Further, the fourth microgrid cell 590 may include the same configuration and function as the third microgrid cell 500, and may be selectively connected to the emergency cell 1900.

Specifically, the emergency cell 1900 may be selectively connected to at least one of the third and fourth microgrid cells 500 and 590.

That is, when the power shortage of the load included in the third microgrid cell 500, the integrated control system 100 may connect the emergency cell 1900 with the third microgrid cell 500. In the event of power shortage of the load included in the fourth microgrid cell 590, the emergency cell 1900 may be connected to the fourth microgrid cell 590.

In another example, when both the load included in the third microgrid cell 500 and the load included in the fourth microgrid cell 590 are in a power shortage state, the integrated control system 100 may simultaneously connect the emergency cell 1900 to both the third and fourth microgrid cells 500 and 590.

For reference, the fourth microgrid cell 590 may be selectively connected to the emergency cell 1900 via a separate conversion switch (not shown). The conversion switch may be operated by the integrated control system 100.

As such, the fourth microgrid cell 590 and the emergency cell 1900 may be selectively connected to each other via the conversion switch operated by the integrated control system 100.

Further, the integrated control system 100 may calculate the power shortage amount of the load based on the power state of the load in the third microgrid cell 500 received from the middleware server 200 and determine the first power supply amount based on the shortage amount. The integrated control system 100 may calculate the power shortage amount of the load based on the power state of the load in the fourth microgrid cell 590 received from the middleware server 200 and determine the second power supply amount based on the shortage amount.

Moreover, the integrated control system 100 may generate a first control signal including information on the determined first power supply amount and a second control signal including information on the determined second power supply amount, and then may transmit the generated first and second control signals to the emergency cell 1900 via the middleware server 200.

The first and second control signals provided to the emergency cell 1900 may be transmitted to the additional ESS (not shown) (996 in FIG. 8) disposed in the emergency cell 1900. The additional ESS may supply power to the loads included in the third and fourth microgrid cells 500 and 590, respectively, based on the first and second control signals.

For reference, FIG. 9 shows only two virtual cells, that is, the third and fourth microgrid cells 500 and 590. However, the hierarchical power control system 4 according to another embodiment of the present disclosure may include three or more virtual cells. The virtual cells may be selectively connected to the emergency cell 1900 to receive power at the same time or at different timings, from the emergency cell 1900 when a power shortage or power outage occurs.

As described above, in accordance with the present disclosure, the additional ESS may be temporarily connected to the plurality of virtual cells via the emergency cell 1900. Thus, when the power shortage or power outage occurs simultaneously in different timings in multiple normal cells, this problem may be solved.

The present disclosure as described above may be subjected to various substitutions, modifications, and changes within the scope of the present disclosure without departing from the technical spirit of the present disclosure by a person having ordinary knowledge in the technical field to which the present disclosure belongs. Thus, the disclosure is not limited to the accompanying drawings.

What is claimed is:

1. A hierarchical power control system connected to a cloud server, the system comprising:
    a first microgrid cell including a first energy storage system (ESS) having an uninterruptible power supply (UPS) structure, and a first load, wherein a power state of the first load is managed by the first ESS;
    a second microgrid cell including a second load and a second ESS for managing a power state of the second load;
    a third microgrid cell including a third load;
    an emergency cell including an additional ESS having a UPS structure, and an additional emergency generator, wherein the emergency cell is selectively connected to the second microgrid cell;
    a middleware server communicating with the first to third microgrid cells and the emergency cell; and
    an integrated control system configured to:
        receive a power demand and supply state information of each of the first to third microgrid cells via the middleware server; and
        configure an integrated operation schedule based on the received power demand and supply state information of each of the first to third microgrid cells.

2. The hierarchical power control system of claim 1, wherein when an abnormal power state occurs in the second microgrid cell, the integrated control system is configured to:
    calculate a power shortage amount of the second microgrid cell based on the power demand and supply state information of the second microgrid cell received from the middleware server, and determine a power supply amount based on the power shortage amount;
    generate a control signal including information on the determined power supply amount;
    transmit the generated control signal to the emergency cell via the middleware server; and
    connect the emergency cell and the second microgrid cell with each other.

3. The hierarchical power control system of claim 2, wherein the control signal transmitted to the emergency cell is transmitted to the additional ESS and the additional emergency generator,
    wherein the additional ESS supplies power to the second load in an uninterruptible manner, based on the control signal,
    wherein the additional emergency generator supplies power to the second load, based on the control signal,
    wherein the additional ESS and the additional emergency generator are operated in association with each other, based on the control signal.

4. The hierarchical power control system of claim 1, wherein the first microgrid cell further includes a first sensor for detecting a power state of the first load,
    wherein the second microgrid cell further includes a second sensor for detecting a power state of the second load,
    wherein the third microgrid cell further includes a third sensor for detecting a power state of the third load,
    wherein each of the first to third sensors detects the power state of each of the first to third loads and transmits each detected power state to the cloud server.

5. The hierarchical power control system of claim 2, wherein the cloud server is configured to:
    receive at least one of climate data or power-related data from an external entity;

analyze, in a combined manner, the power state of each of the first to third loads received from the first to third sensors, and the at least one of the climate data or power related data received from the external entity; and provide the analysis result to the middleware server.

6. The hierarchical power control system of claim 5, wherein the middleware server provides the analysis result received from the cloud server to the integrated control system, wherein the integrated control system is configured to predict an operation schedule of each of the first to third microgrid cells, based on the analysis result received from the middleware server.

7. The hierarchical power control system of claim 4, wherein the cloud server provides the power state of each of the first to third loads received from the first to third sensors to the middleware server, wherein the middleware server provides the power state of each of the first to third loads received from the cloud server to the integrated control system, wherein the integrated control system is configured to:

compare the power state of each of the first to third loads received from the middleware server with the integrated operation schedule; and adjust the integrated operation schedule based on the comparison result.

8. The hierarchical power control system of claim 1, wherein the first microgrid cell further includes:

an emergency generator;

a building-related power system including a first distributed power system; and a first energy management system (EMS) for controlling the emergency generator, the building-related power system, and the first ESS, wherein the second microgrid cell further includes:

a second distributed power system operated in association with the second ESS; and a second EMS for controlling the second ESS and the second distributed power system.

9. The hierarchical power control system of claim 8, wherein the building-related power system further includes:

a building energy management system (BEMS);

a distribution board communicating with the BEMS;

a building automation system (BAS) communicating with the BEMS;

an air conditioning system connected to the BAS;

the first distributed power system connected to the BAS; and a third ESS connected to the BAS, wherein the BEMS is configured to control at least one of the air conditioning system, the first distributed power system, or the third ESS using the BAS, thereby to reduce peak load.

10. The hierarchical power control system of claim 8, wherein the integrated control system is configured to receive the power demand and supply state information via the middleware server, wherein the power demand and supply state information includes first power demand and supply state information received from the first EMS, and second power demand and supply state information received from the second EMS, wherein the first power demand and supply state information includes at least one of power amount information generated in the first microgrid cell, required power amount information therein, or operation schedule information of the first ESS, wherein the second power demand and supply state information includes at least one of power amount information generated in the second microgrid cell, required power amount information therein, or operation schedule information of the second ESS.

11. The hierarchical power control system of claim 8, wherein the integrated control system is configured to provide the integrated operation schedule to the first EMS and second EMS via the middleware server, wherein the first EMS adjusts a power supply and demand schedule of the first microgrid cell, based on the integrated operation schedule received via the middleware server, wherein the second EMS adjusts a power supply and demand schedule of the second microgrid cell, based on the integrated operation schedule received via the middleware server.

12. A hierarchical power control system connected to a cloud server, the system comprising:

a first microgrid cell including a first energy storage system (ESS) having an uninterruptible power supply (UPS) structure, and a first load, wherein a power state of the first load is managed by the first ESS;

a second microgrid cell including a second load, and a second ESS for managing a power state of the second load;

a third microgrid cell including a third load;

a fourth microgrid cell including a fourth load, and a third ESS managing a power state of the fourth load;

an emergency cell including an additional ESS having a UPS structure, and an additional emergency generator, wherein the emergency cell is selectively connected to at least one of the second microgrid cell or the fourth microgrid cell;

a middleware server communicating with the first to fourth microgrid cells and the emergency cell; and an integrated control system configured to:

receive a power demand and supply state information of each of the first to fourth microgrid cells via the middleware server; and configure an integrated operation schedule based on the received power demand and supply state information of each of the first to fourth microgrid cells.

13. The hierarchical power control system of claim 12, wherein when an abnormal power state occurs in the second and fourth microgrid cells, the integrated control system is configured to:

calculate a first power shortage amount of the second microgrid cell based on the power demand and supply state information of the second microgrid cell received from the middleware server, and determine a first power supply amount based on the first power shortage amount;

calculate a second power shortage amount of the fourth microgrid cell based on the power demand and supply state information of the fourth microgrid cell received from the middleware server, and determine a second power supply amount based on the second power shortage amount;

generate a first control signal including information on the determined first power supply amount, and a second control signal including information on the determined second power supply amount;

provide the generated first and second control signals to the emergency cell via the middleware server; and connect the second and fourth microgrid cells with the emergency cell.

14. The hierarchical power control system of claim 13, wherein the first and second control signals provided to the emergency cell are transmitted to the additional ESS and the additional emergency generator,
wherein the additional ESS supplies power in an uninterruptible manner to the second and fourth loads, respectively, based on the first and second control signals,
wherein the additional emergency generator supplies power to the second and fourth loads, respectively, based on the first and second control signals,
wherein the additional ESS and the additional emergency generator are operated in association with each other, based on the first and second control signals.

15. A hierarchical power control system connected to a cloud server, the system comprising:
a first microgrid cell including a first energy storage system (ESS) having an uninterruptible power supply (UPS) structure, and a first load, wherein a power state of the first load is managed by the first ESS;
a second microgrid cell including a second load and a second ESS for managing a power state of the second load;
a third microgrid cell including a third load;
an emergency cell including an additional ESS, wherein the emergency cell is selectively connected to the third microgrid cell;
a middleware server communicating with the first to third microgrid cells and the emergency cell; and
an integrated control system configured to communicate with the middleware server, and to control power demand and supply of each of the first to third microgrid cells based on the communication result.

16. The hierarchical power control system of claim 15, wherein the first microgrid cell further includes a first sensor for detecting a power state of the first load,
wherein the second microgrid cell further includes a second sensor for detecting a power state of the second load,
wherein the third microgrid cell further includes a third sensor for detecting a power state of the third load,
wherein each of the first to third sensors detects the power state of each of the first to third loads and transmits each detected power state to the cloud server,
wherein the cloud server provides the power state of each of the first to third loads received from the first to third sensors to the middleware server,
wherein the middleware server provides the power state of each of the first to third loads received from the cloud server to the integrated control system.

17. The hierarchical power control system of claim 16, wherein when an abnormal power state occurs in the third microgrid cell, the integrated control system is configured to:
calculate a power shortage amount of the third microgrid cell based on the power demand and supply state information of the third microgrid cell received from the middleware server, and determine a power supply amount based on the power shortage amount;
generate a control signal including information on the determined power supply amount;
transmit the generated control signal to the emergency cell via the middleware server; and
connect the emergency cell and the third microgrid cell with each other.

18. The hierarchical power control system of claim 17, wherein the control signal transmitted to the emergency cell is transmitted to the additional ESS,
wherein the additional ESS supplies power to the third load based on the control signal.

19. The hierarchical power control system of claim 16, wherein the cloud server is configured to:
receive at least one of climate data or power-related data from an external entity;
analyze, in a combined manner, the power state of each of the first to third loads received from the first to third sensors, and the at least one of the climate data or power related data received from the external entity; and
provide the analysis result to the middleware server.

20. The hierarchical power control system of claim 19, wherein the middleware server provides the analysis result received from the cloud server to the integrated control system,
wherein the integrated control system is configured to predict an operation schedule of each of the first to third microgrid cells, based on the analysis result received from the middleware server.

21. The hierarchical power control system of claim 16, wherein each of the first to third microgrid cells transmits each power demand and supply state information to the integrated control system via the middleware server,
wherein the integrated control system configures an integrated operation schedule based on the power demand and supply state information of each of the first to third microgrid cells received via the middleware server.

22. The hierarchical power control system of claim 16, wherein the integrated control system is configured to:
compare the power state of each of the first to third loads received from the middleware server with the integrated operation schedule; and
adjust the integrated operation schedule based on the comparison result.

23. The hierarchical power control system of claim 16, wherein the first microgrid cell further includes:
an emergency generator;
a first building-related power system including a first distributed power system; and
a first energy management system (EMS) for controlling the emergency generator, the first building-related power system, and the first ESS,
wherein the second microgrid cell further includes:
a second distributed power system operated in association with the second ESS; and
a second EMS for controlling the second ESS and the second distributed power system.

24. The hierarchical power control system of claim 23, wherein the first building-related power system further includes:
a building energy management system (BEMS);
a distribution board communicating with the BEMS;
a building automation system (BAS) communicating with the BEMS;
an air conditioning system connected to the BAS;
the first distributed power system connected to the BAS; and
a third ESS connected to the BAS,
wherein the BEMS is configured to control at least one of the air conditioning system, the first distributed power system, or the third ESS using the BAS, thereby to reduce a peak load of the first load.

25. The hierarchical power control system of claim 23, wherein the first EMS transmits first power demand and supply state information to the integrated control system via the middleware server,
wherein the second EMS transmits second power demand and supply state information to the integrated control system via the middleware server,
wherein the third sensor transmits third power demand and supply state information to the integrated control system via the cloud server and then via the middleware server,
wherein the integrated control system is configured to configure an integrated operation schedule based on the first to third power demand and supply state information received via the middleware server,
wherein the first power demand and supply state information includes at least one of power amount information generated in the first microgrid cell, required power amount information therein, or operation schedule information of the first ESS,
wherein the second power demand and supply state information includes at least one of power amount information generated in the second microgrid cell, required power amount information therein, or operation schedule information of the second ESS,
wherein the third power demand and supply state information includes power amount information required in the third microgrid cell.

26. The hierarchical power control system of claim 23, wherein the integrated control system is configured to provide the integrated operation schedule to the first and second EMS via the middleware server,
wherein the first EMS adjusts a power supply and demand schedule of the first microgrid cell based on the integrated operation schedule received via the middleware server,
wherein the second EMS adjusts a power supply schedule of the second microgrid cell based on the integrated operation schedule received via the middleware server.

27. The hierarchical power control system of claim 24, wherein the emergency cell includes a second building-related power system including the additional ESS,
wherein the second building-related power system further includes:
an additional BEMS;
an additional distribution board communicating with the additional BEMS;
an additional BAS communicating with the additional BEMS and connected to the additional ESS;
an additional air conditioning system connected to the additional BAS; and
an additional distributed power system connected to the additional BAS.

28. The hierarchical power control system of claim 27, wherein when the emergency cell and the third microgrid cell are connected to each other,
the additional BEMS controls at least one of the additional air conditioning system, the additional distributed power system, or the additional ESS using the additional BAS, thereby to reduce a peak load amount of the third load.

29. A hierarchical power control system connected to a cloud server, the system comprising:
a first microgrid cell including a first energy storage system (ESS) having an uninterruptible power supply (UPS) structure, and a first load, wherein a power state of the first load is managed by the first ESS;
a second microgrid cell including a second load, and a second ESS for managing a power state of the second load;
a third microgrid cell including a third load;
a fourth microgrid cell including a fourth load;
an emergency cell including an additional ESS, wherein the emergency cell is selectively connected to at least one of the third microgrid cell or the fourth microgrid cell;
a middleware server communicating with the first to fourth microgrid cells and the emergency cell; and
an integrated control system configured to communicate with the middleware server, and to control power demand and supply of each of the first to fourth microgrid cells based on the communication result.

30. The hierarchical power control system of claim 29, wherein the first microgrid cell further includes a first sensor for detecting a power state of the first load,
wherein the second microgrid cell further includes a second sensor for detecting a power state of the second load,
wherein the third microgrid cell further includes a third sensor for detecting a power state of the third load,
wherein the fourth microgrid cell further includes a fourth sensor for detecting a power state of the fourth load,
wherein each of the first to fourth sensors detects the power state of each of the first to fourth loads and transmits each detected power state to the cloud server,
wherein the cloud server provides the power state of each of the first to fourth loads received from the first to fourth sensors to the middleware server,
wherein the middleware server provides the power state of each of the first to fourth loads received from the cloud server to the integrated control system.

31. The hierarchical power control system of claim 30, wherein when an abnormal power state occurs in the third and fourth microgrid cells, the integrated control system is configured to:
calculate a first power shortage amount of the third load based on the power state of the third load received from the middleware server, and determine a first power supply amount based on the first power shortage amount;
calculate a second power shortage amount of the fourth load based on the power state of the fourth load received from the middleware server, and determine a second power supply amount based on the second power shortage amount;
generate a first control signal including information on the determined first power supply amount, and a second control signal including information on the determined second power supply amount;
provide the generated first and second control signals to the emergency cell via the middleware server; and
connect the second and fourth microgrid cells with the emergency cell.

32. The hierarchical power control system of claim 31, wherein the first and second control signals provided to the emergency cell are transmitted to the additional ESS,
wherein the additional ESS supplies power to the third and fourth loads based on the first and second control signals.

* * * * *